United States Patent [19]
Read et al.

[11] Patent Number: 4,620,279
[45] Date of Patent: Oct. 28, 1986

[54] DATA TRANSFER SYSTEM

[75] Inventors: Randol R. Read, Tulsa; Everett L. Cox, Broken Arrow; Randall L. Selzler, Tulsa, all of Okla.

[73] Assignee: Standard Oil Company, now Amoco Corporation, Chicago, Ill.

[21] Appl. No.: 518,518

[22] Filed: Jul. 29, 1983

[51] Int. Cl.⁴ .............................................. G06F 13/28
[52] U.S. Cl. .................................................. 364/200
[58] Field of Search ... 364/200 MS File, 900 MS File

[56] References Cited

U.S. PATENT DOCUMENTS 3,686,641  8/1972  Logan et al. ....................... 364/200
4,149,242  4/1979  Pirz ..................................... 364/200
4,470,115  9/1984  Wehr ................................... 364/300

OTHER PUBLICATIONS

Kernighan, B. W. et al., "The UNIX Programming Environment", IEEE, Computer, Apr. 1981.

Primary Examiner—Thomas M. Heckler
Attorney, Agent, or Firm—Timothy D. Stanley

[57] ABSTRACT

A data transfer system is disclosed for a computer system which includes at least one processor, a memory coupled to the processor, and two direct memory access selector channels. A hardware interconnection is provided between the two selector channels such that they can be used to transfer data from one portion of the memory system to another directly, using direct memory access techniques, without intermediate mass storage. The disclosed software provides a transfer system which mimics the use of magnetic tapes in many respects in order to simplify use of the system.

20 Claims, 6 Drawing Figures

DATA TRANSFER SYSTEM

BACKGROUND OF THE INVENTION

The present invention relates to an improved data transfer system that utilizes a hardware interconnection between two direct memory access channels to provide high speed transfer of data between two portions of a computer memory system, without intermediate mass storage.

In a range of complex data processing tasks, scratch tapes or other mass storage devices are used to store intermediate processing results. For example, many seismic data processing tasks consist of a series of steps that are applied to a set of seismic data that are initially stored on magnetic tape. Each step is a separate program which may, for example, read a set of input data from magnetic tape (generated by the preceding step) process the input data, and then generate a set of output data on magnetic tape (which is subsequently supplied as an input to the next step). Such intermediate scratch tapes are often used because the volume of data is large and they allow each step to be developed as a separate entity. Seismic data processing tasks may consist of ten or more individual steps, each linked to the next by a corresponding scratch tape.

Such extensive use of scratch tapes represents a significant limitation on execution speed, since the reading and writing of such tapes is both time-consuming and susceptible to errors.

In the past, a number of approaches have been proposed for simplifying the sequential processing of digital information. For example, the UNIX system described by B. W. Kernighan and J. R. Mashey in the article entitled, "The UNIX Programming Environment"; IEEE (Computer), April 1981, pp. 12-24, utilizes an operating system which facilitates the linking of sequential processing steps. However, no hardware is described in this paper to provide high speed data transfer between two portions of computer memory.

Pirz U.S. Pat. No. 4,149,242 discloses an interface apparatus for multiple sequential processors in which a plurality of processors, each with its own memory, are linked in series by a chain of transfer units. The operation of the processors is synchronized carefully such that data transfers between adjacent processors occur simultaneously. Thus, each of the processors executes its task with the data stored in its respective memory, and then the data are moved from one memory to the next simultaneously. Thus, each processor must complete its respective task within the time period between adjacent data transfers so that the next data transfer can take place. In this sense all of the processors are required to run in synchrony.

Neither of these two prior art approaches utilizes specifically designed hardware to allow two asynchronously running programs to be linked together for high speed data transfer therebetween, without scratch tapes or other intermediate mass storage.

SUMMARY OF THE INVENTION

The present invention is directed to an improved, high speed data transfer system which provides the high transfer speeds of direct memory access techniques while simultaneously reducing or eliminating the problems and time delays associated with the use of scratch tapes.

A data transfer method is provided for use with a computer system which comprises at least one processor, a memory system coupled to the at least one processor, and at least first and second selector channels, each of which is coupled to the memory system. The method of this invention comprises the steps of first providing a hardware interconnection between the first and second selector channels to allow digital information to be transferred directly from the first selector channel to the second selector channel. A first program is run on the computer system to generate a first set of a digital data and to store said first set in a first portion of the memory system. A second program is simultaneously run on the computer system, asynchronously with respect to the first program, and this second program is adapted to process the first set of digital data as stored in a second portion of the memory system. The first and second selector channels and the hardware interconnection are utilized to transfer the first set of digital data in the first portion of the memory system directly to the second portion of the memory system without intermediate mass storage.

The method of this invention allows two independent programs to be run asynchronously and simultaneously on a computer system. The first serves to generate a set of data. In the preferred embodiment of the method of this invention, the first computer program issues a data write request after this set of data has been generated, and the second program issues a data read request when it is ready to receive the data. At this point, the execution of both the first and second programs may be suspended while the first and second selector channels and the hardware interconnection are utilized to transfer data directly from the first to the second portions of the memory system using direct memory access techniques.

An important advantage of this invention is that the transfer is in many ways quite similar to the generation and reading of a magnetic tape, at least at the level of the programmer. The first program writes into a data pipe coupled to the first selector channel (which is in many ways similar to writing onto a magnetic tape) and the second program reads from a data pipe coupled to the second selector channel (which is in many ways similar to reading from a magnetic tape). Thus, the simplicity and the independence of operation obtained with magnetic tapes is to a large extent preserved, while eliminating errors and time delays associated with the use of magnetic tapes.

A related advantage is that the data transfer system of this invention allows the reading and writing programs to be run asynchronously. They can start and stop execution at differing times, and they can make data transfer requests at differing times. In the preferred embodiment described below, the execution of each of the programs requesting a data transfer is suspended until the transfer is complete. Thus, the first to request a transfer in effect waits until the other program requests the transfer as well. In this way, the standard techniques used to arrange I/O data transfers can be used and the problems associated with synchronized programs can be largely avoided.

According to a second feature of this invention, a computer system of the type comprising a central processing unit, a memory system coupled to the central processing unit, and at least two direct memory access channels coupled to the memory system is provided with means for providing a hardware interconnection between the two direct memory access channels to permit high speed transfer of digital information therebetween, such that a selected set of digital data can be read from a first portion of the memory system and written into a second portion of the memory system via the two channels and the interconnection means at high speed, without intermediate mass storage of the set of digital data. As will become apparent from the following discussion, this apparatus is well suited for use in the method of this invention.

The invention itself will best be understood by reference to the following detailed description, taken in conjunction with the accompanying drawings.

DETAILED DESCRIPTION OF THE PREFERRED EMBODIMENTS

Figure 1:
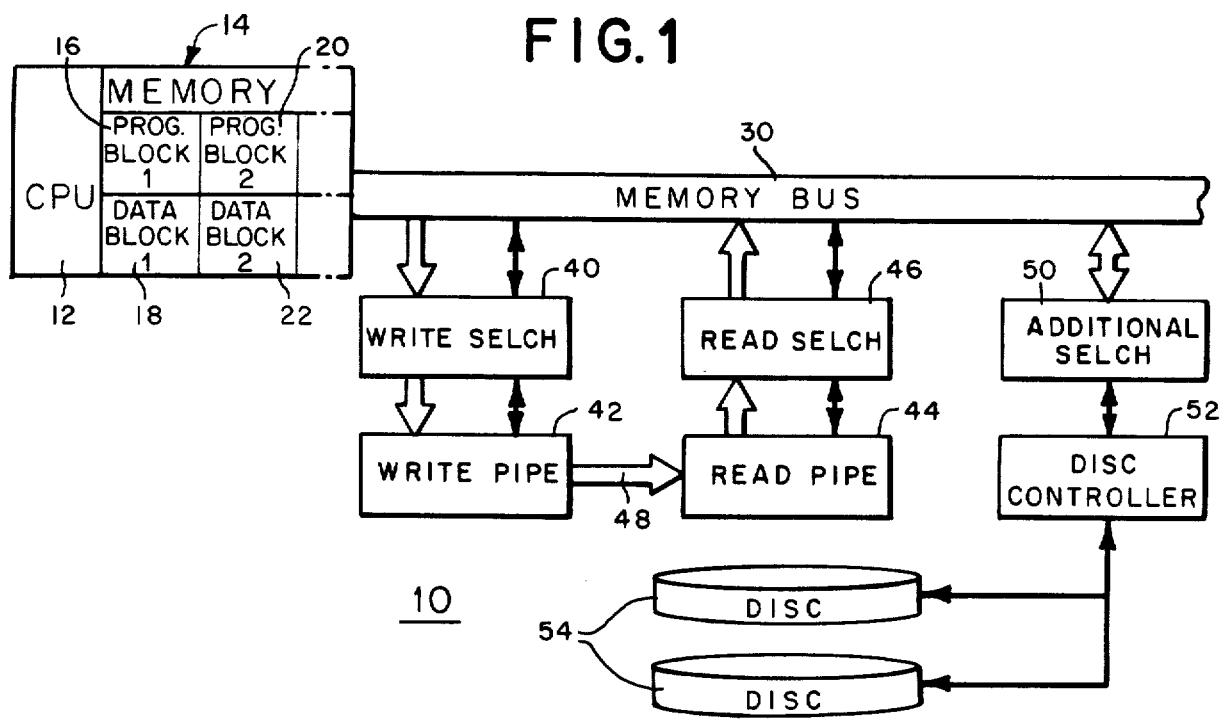
FIG. 1 is a block diagram of a computer system which incorporates a first preferred embodiment of the present invention.

Turning now to the drawings, FIG. 1 shows a general block diagram of a computer system 10 which incorporates a presently preferred embodiment of this invention. This computer system 10 includes a central processing unit 12 coupled to a memory system 14. As schematically shown in FIG. 1, this memory system 14 defines in this embodiment at least four blocks of memory locations 16, 18, 20, 22. Blocks 16 and 18 are a first program block and a first data block, respectively, and blocks 20 an 22 are a second program block and a second data block, respectively. The CPU 12 is controlled by an operating system stored in the memory system 14 so as to allow the simultaneous, asynchronous running (by time sharing of the single CPU 12) of the programs stored in the first and second program blocks 16, 20, respectively. The first program in block 16 operates to generate a first set of digital data and to store this data in block 18, and the second program in block 20 utilizes digital data stored in the second block 22 in its operation.

The computer system 10 includes a memory bus 30 to which are connected a write selector channel or selch 40, a read selch 46 and may optionally include at least one additional selch 50. The write selch 40 is connected to a write pipe 42, and the read selch 46 is connected to a read pipe 44. The write and read pipes 42,44 are interconnected with one another by a hardware cable interconnection 48. The structure and operation of the read and write pipes 44,42 will be described in detail below in conjunction with FIGS. 2-5. The additional selch 50 is connected in the conventional manner to a disc controller 52, which operates to control a plurality of magnetic storage discs 54. Each of the selches 40,46,50 is coupled to transfer data with substantially the entire memory system 14.

As used herein, the terms selector channel and selch are used to designate a direct memory access device which operates to transfer digital data to or from a memory system, without constant supervision of the CPU. Such direct memory access devices are well known to those skilled in the art and will not be described in detail here. For example, the Perkin-Elmer Corporation markets a selch under Model No. 3200 (Computer Systems Division, 2 Crescent Place, Oceanport, N.J. 07757). Perkin-Elmer Publication No. H29-727R09 should be referenced for a detailed description of the method of operation of the Perkin-Elmer Model 3200 selch.

Once initiated, this selch performs data transfers to or from the memory and I/O device, independent of processor control. To start the data transfer, the processor sets up the device coupled to the selch to provide or receive data, provides the selch with the starting and final memory addresses of the block to be transferred and the type of transfer (read or write), and then issues a "GO" command. The selch then performs the data transfer without further direction from the processor. In the Model 3200 Perkin-Elmer selch, the processor is notified by an interrupt from the selch when the transfer is completed. Thus, for example, a conventional use of a selch is as shown in connection with the additional selch 50, in which the selch operates to transfer data from the memory 14 to the disk controller 52 or vice versa, without direct supervision of the CPU 12.

DATA PIPE HARDWARE

Figure 2:
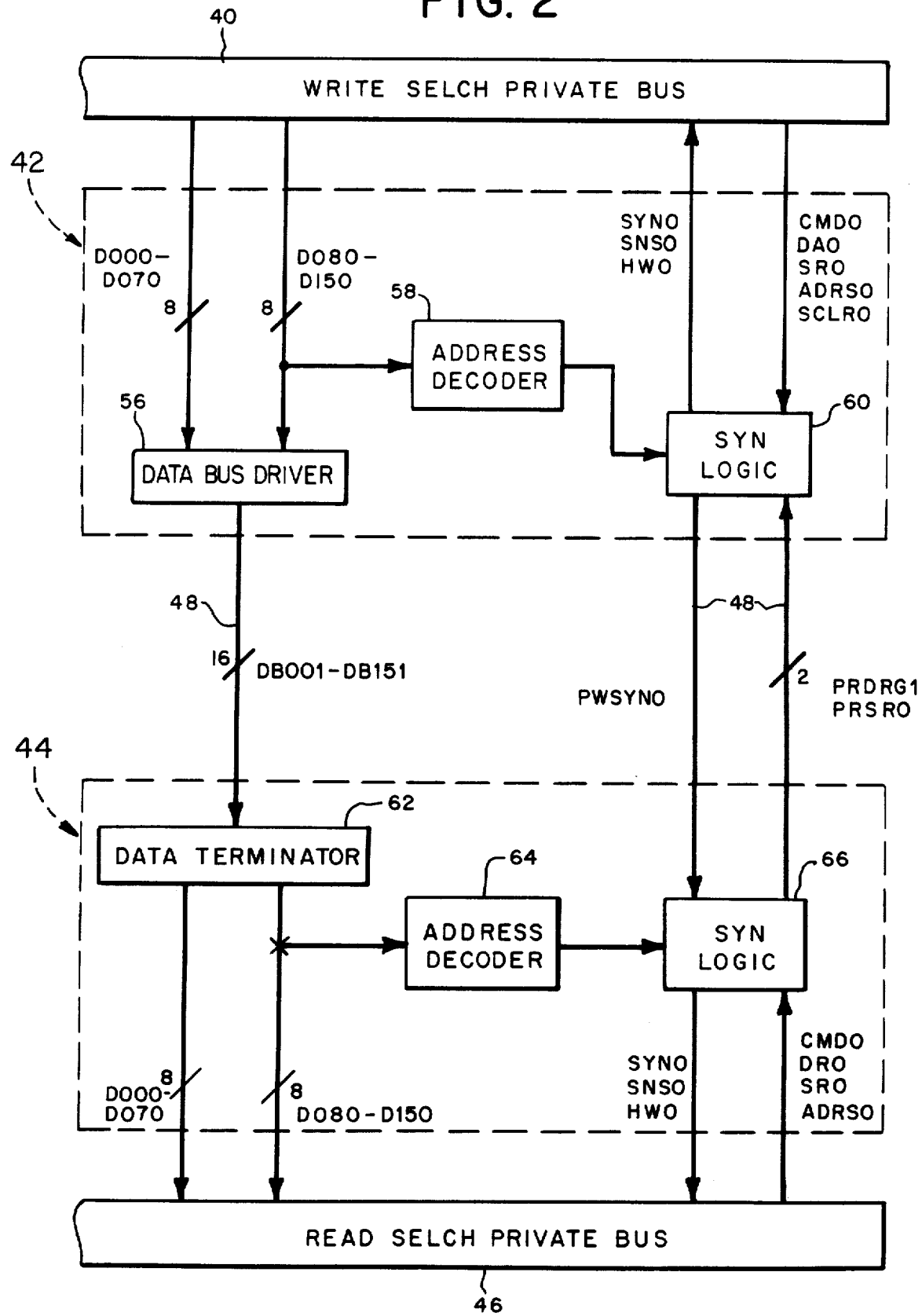
FIG. 2 is a more detailed block diagram of the read and write pipes of FIG. 1.

The present invention is directed to the write and read data pipes 42,44 and their method of use and operation. FIG. 2 provides a more detailed block diagram of the component elements of the write and read pipe 42,44.

As shown in FIG. 2, the write pipe 42 includes a 16-bit data bus driver 56 which is adapted to receive 16-bit half-words from the private bus of the write selch 40. The write pipe 42 also includes an address decoder 58 which is responsive to 8 data bits D080 through D150 of the write selch private bus. The block entitled "SYN LOGIC" 60 of FIG. 2 denotes the control circuitry of the write pipe 42 which cooperates with corresponding circuitry in the read pipe 44 to control data transfer from the write pipe 42 to the read pipe 44.

Similarly, the read pipe 44 includes a 16-bit data terminator 62 which is adapted to receive 16-bit parallel half-words from the data bus driver 56 and to pass this digital information to the private bus of the read selch 46. The read data pipe 44 includes an 8-bit address decoder 64 coupled to data bits D080-D150 of the read selch private bus, as well as a SYN LOGIC 66 coupled to interact with the SYN LOGIC 60 of the write data pipe 42. In FIG. 2 the symbol "/" coupled with an adjacent numeral indicates the number of parallel data lines included in certain of the interconnections of the figure. Symbols are provided adjacent each of the lines to indicate the names of the signals transmitted over these lines.

Figure 3:
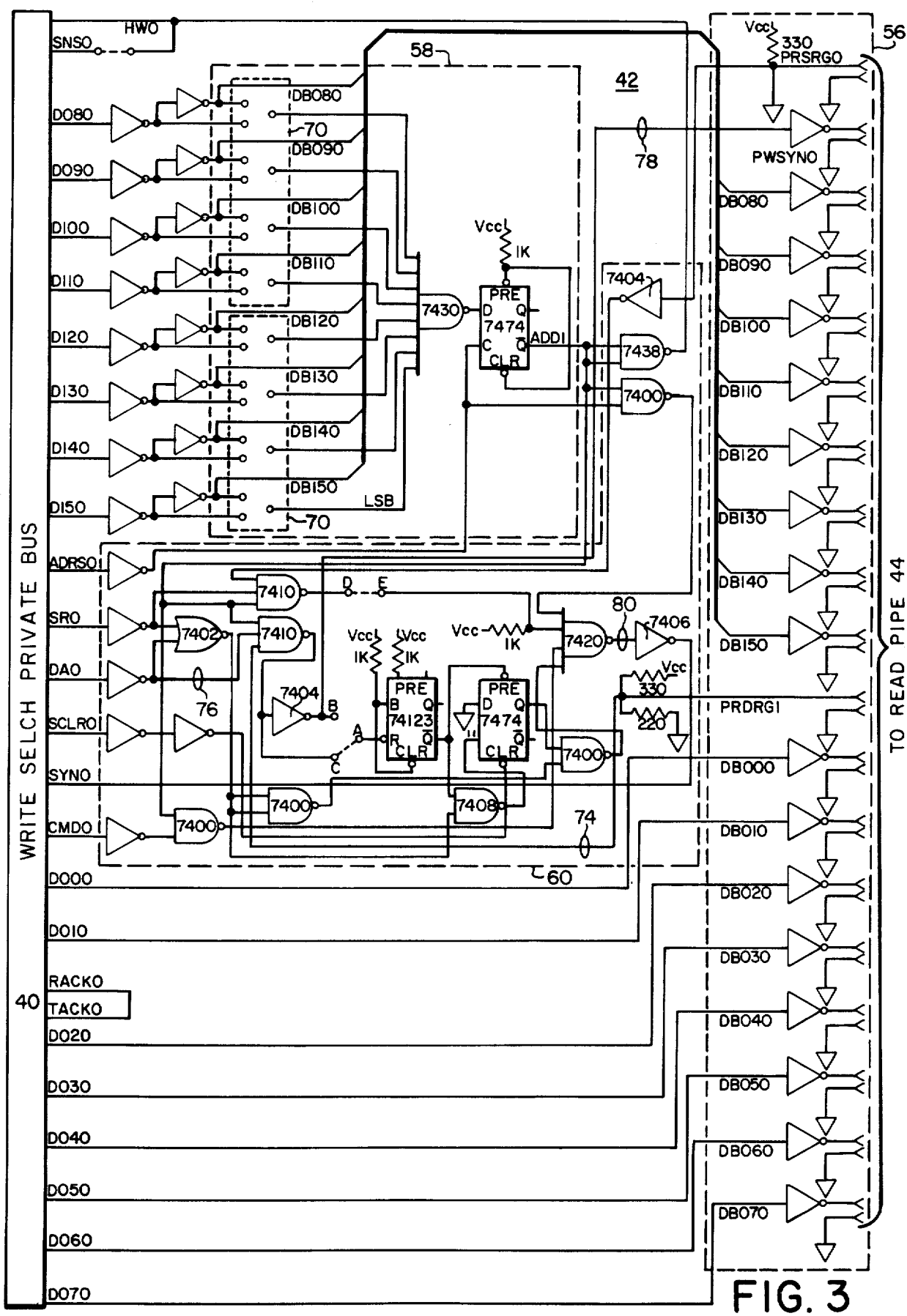
FIG. 3 is a detailed electronic schematic diagram of the write pipe of FIGS. 1 and 2.

FIG. 3 provides a detailed electrical schematic of the write pipe 42, in which the data bus driver 56, the address decoder 58, and the SYN LOGIC 60 have been outlined in dotted lines. In FIG. 3 all inverters are type 7404 inverters except those included in the data bus driver 56, which are type 7406 inverters.

Figure 4:
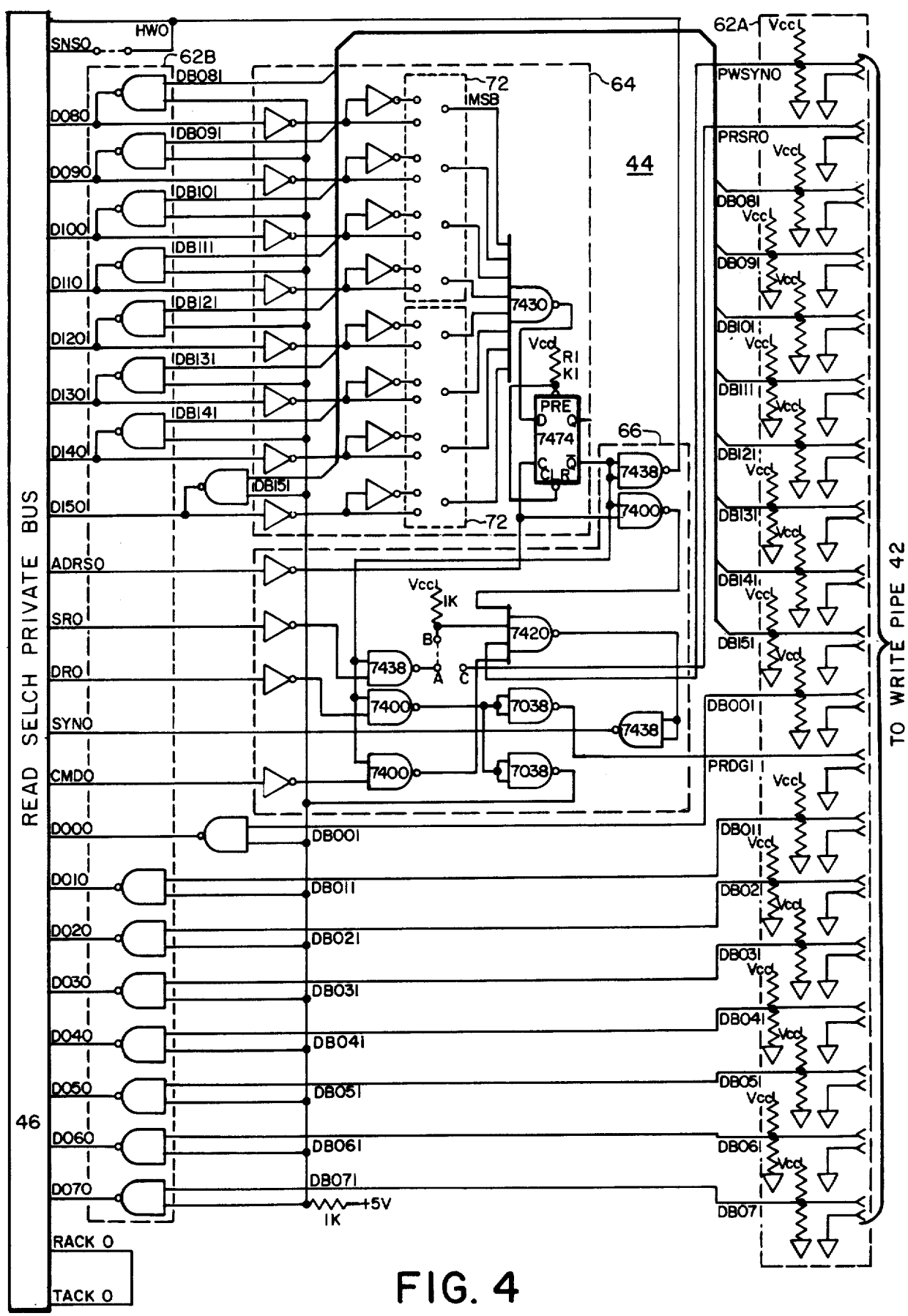
FIG. 4 is a detailed electronic schematic diagram of the read pipe of FIGS. 1 and 2.

Similarly, FIG. 4 shows a detailed electrical schematic of the read data pipe 44, including the address decoder 64 and the SYN LOGIC 66. In FIG. 4, the data terminator 62 is made up of two component parts identified by reference numerals 62a and 62b in the drawing. Unless otherwise shown, the gates of the data terminator 62b in FIG. 4 are type 7438 NAND gates and all inverters are type 7404.

As shown in FIG. 2, the data bus driver 56 is connected to the data terminator 62 and the SYN LOGIC 60 is connected with the SYN LOGIC 66 by respective conductors. In this preferred embodiment, a 25-pair pin to pin cable 48 is used to provide these interconnections directly, without intermediate storage such as scratch tapes. In FIGS. 2-5 the last digit of each variable name indicates whether the variable is active when in the Logic High state or the Logic Low state. Variables which are active in the Logic High state terminate with the number 1, and variables active in the Logic Low state terminate with the number 0.

Turning now to the detailed schematic of FIG. 3, address decoder 58 of the write pipe 42 includes two 4-bit jumper blocks 70. Through the use of suitable jumpers any address between 00 and FF can be selected. When the selected address appears on data lines D080-D150 and the ADRS0 signal makes a transition from high to low, the signal ADD1 is latched high, indicating that the write pipe 42 has been addressed.

When the address decoder 58 latches ADD1 high, a number of things happen. The signals HW0 and SNS0 are pulled low to indicate to the write selch 40 that data transfer is to proceed in parallel half-word (16-bit) segments, and that the high speed data transfer sequence is to be used. The signals HW0 and SNS0 are explained in greater detail at pages 2-5 and 2-11 of the above-identified Perkin-Elmer Publication No. H29-727R09. Furthermore, the SYN LOGIC 60 is enabled, such that the SYN0 signal is returned to the write selch 40 in response to a signal on any of the lines CMD0, SR0 or ADRS0, and then SYN LOGIC 60 responds to signals on the lines DA0, SCLR0.

In use, the write selch 40 presents 16 parallel bits on data lines D000-D150 along with a Data Available signal in line DA0. The write pipe 42 presents these 16 bits to the read pipe 44 via the lines DB000-DB150 of the cable 48, along with a gated Data Available signal PWSYN0. PWSYN0 is generated in the write pipe 42 by gating DA0 with the address signal ADD1, and PWSYN0 indicates whether or not data are available for transfer on DB000-DB150.

FIG. 4 shows a schematic diagram of the read pipe 44, which includes the address decoder 64, the SYN LOGIC 66, and the data terminator 62a,62b. The address decoder 64 includes jumper blocks 72 which are used to define an address for the read pipe 44, different from that of the write pipe 42. The address decoder 64 latches the SYN LOGIC 66 on when the selected address and the ADRS0 signal appear on the private bus of the read selch 46. When the SYN LOGIC 66 has been latched on, the read pipe 44 pulls the signals HW0 and SNS0 low on the read selch private bus and reacts to signals on the lines ADRS0, SR0, and CMD0 by returning the SYN0 signal to the read selch 46. The SYN LOGIC 66 also gates the Data Request signal DR0 from the read selch private bus with the output of the address decoder 64 and passes this gated Data Request signal PRDRG1 to the write pipe 42 via the cable 48.

DATA PIPE OPERATION

The theory of operation and timing of the write and read pipes 42,44 can now be described. First, it should be understood that data being transferred always flow from the write selch 40 to the read selch 46, via the write pipe 42, the cable 48, and the read pipe 44. In effect, the write pipe 42 writes the data into the read pipe 44 and the read pipe 44 reads the data from the write pipe 46.

When the write pipe 42 has been addressed and the write selch 40 is prepared to transfer data on the lines D000-D150 of its private bus, it presents 16 bits of data on the lines D000-D150 along with a Data Available signal on line DA0. The write pipe 42 presents the data to the read pipe 44 on lines DB000-DB150 of the cable 48, along with the gated Data Available signal PWSYN0. At this point, the write pipe 42 does not return the SYN0 signal to the write selch 40; this causes the write selch 40 to maintain the data on lines D000-D150 of its private bus.

Once the read pipe 44 has been addressed by the read selch 46 and has received a Data Request signal on line DR0, the read pipe then gates the data on lines DB000-DB150 of the cable 48 directly to the private bus of the read selch 46, without intermediate storge. The read selch 46 latches the data and removes the Data Request signal on line DR0. A SYN0 signal is returned to the write selch 40 a selected time after the data have been gated to the private bus of the read selch 46, and the write selch 40 then removes the data and the DA0 signal from its private bus to complete the transfer of one 16-bit half word.

Figure 5:
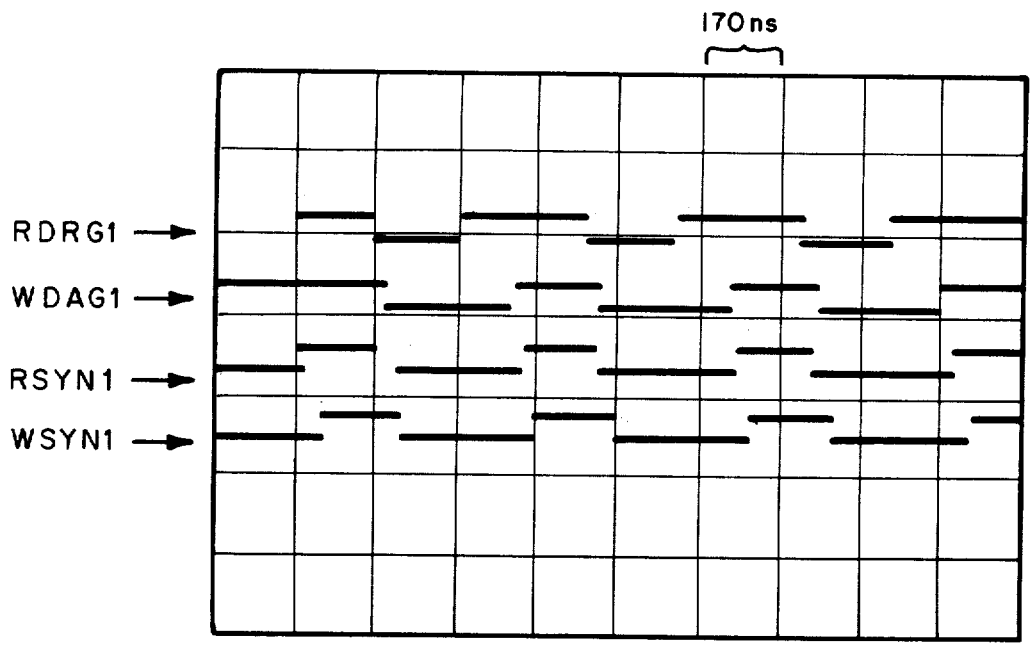
FIG. 5 is a timing wave form diagram of selected signals associated with the read and write pipes of FIGS. 3 and 4.

This timing arrangement is illustrated in FIG. 5, in which the following symbols are used: RDRG1 represents the gated Data Request signal generated by the read pipe 44 at line 74 (active high); WDAG1 represents the gated Data Available signal generated by the write pipe 42 at line 76 (active high); RSYN1 represents the synchronization signal generated by the write pipe 42 at line 78 and returned to the read selch 46 (active high); and WSYN1 represents the synchronization signal generated by the RACK0 signal of the above-identified Perkin-Elmer write pipe 42 at line 80 and returned to the write selch (active high).

In practice, it has been found that the read and write pipes 44,42 may be plugged into the private buses of any two selches of the computer system. For example, when using a Model 3200 selch (as described in the above-referenced publication No. H29-727R09) and a Perkin-Elmer 3220 or 3240 digital processing system, the read and write pipes 44,42 can be embodied as half circuit boards which are plugged into the private buses of the respective selches, on the connector 1 side of the Perkin-Elmer I/O chassis. It is advisable that selches at the lowest possible priority on the memory bus be used. Preferably, the selches for the read and write pipes 44,42 should be at a lower memory bus priority than mechanical devices such as disk and tape units. Also, it is preferable that no other devices be on the read and write selches 46,40, in order to prevent interference by slower I/O devices, such as magnetic tape or disc units.

Since the write and read pipes 42,44 do not generate interrupts, they do not trap RACK0 signals and it is therefore not necessary to remove the RACK0-TACK0 jumper from the chassis backplate. As described above, the read and write pipes 44,42 support the high speed transfer sequence and half word transfer format, and indicate this capability by holding the SNS0 and HW0 lines low. With some Perkin-Elmer computers it may be necessary to install a selch high-speed jumper as shown on Page 1-13 of the above-referenced publication H29-727R09. Furthermore, it may be necessary to connect pin 124-1 of the Perkin-Elmer I/O chassis, which in some cases is not connected at the factory.

It has been found that maximum data rates of approximately 4.3 million bytes per second for each of the write pipe 42 and the read pipe 44 can be obtained if the two pipes 42,44 are connected to selches 40,44 on different DMA buses. This is not a requirement for operation, however. Measurements have indicated that a transfer rate of about 3.6 million bytes per second can be achieved using a single DMA bus.

Since both the write and read pipes 42,44 each have only one function, no commands are needed. However, if a command is issued to either the write pipe 42 or the read pipe 44 via the respective line CMD0, the signal SYN0 will be returned. Similarly, since there is no mechanical storage device associated with either the write or read pipes 42,44, there is no need for status information from either pipe. However, both the write and read pipes 42,44 respond to a status request signal on the respective line SR0 by returning a SYN0 signal.

DATA PIPE PROGRAM CONTROL

The computer system can be programmed to use the data pipes 42,44 to transfer data directly from one program to another, without intermediate storage. In the example of FIG. 1, after the first program in conjunction with a data pipe driver, to be discussed further, in the block 16 has generated the desired data in the data block 18, the first program in conjunction with a data pipe driver, to be discussed further, can then set up the write selch 40 with the beginning and ending addresses of the first data block 18, address and write pipe 42, and then direct an output go command to write selch 40 with the read/write bit set properly. Then the second program in the block 20 in conjunction with the data pipe driver of the operating system can set up the read selch 46 with the beginning and ending addresses of the second data block 22, address the read pipe 44, and then direct an output go command to the read selch 46 with the read/write bit set properly.

After both selches 40,46 have been started, they utilize the data pipes 42,44 and the cable 48 to transfer data therebetween in order to move the block of data stored in the first data block 18 directly to the second data block 22, without supervision by the CPU 12 or intermediate mass storage. Software may check the status of the selches 40,46 or wait for a selch interrupt to determine when the transfer has been completed. Of course, the transfer does not begin until both selches 40,46 have been started, and it is therefore possible to start the read selch 46 before the write selch 40 rather than vice versa as described above.

The data pipe driver shown in Appendix 1 provides a listing of the presently preferred embodiment of the software used to control the selches 40,46 and the data pipes 42,44. The listing of Appendix 1, which is of course provided by way of example and not by limitation, is suitable for use on the Perkin-Elmer computer system described above, and is adapted to be assembled on the Perkin-Elmer OS-32MT/5.2 assembler.

The program of Appendix 1 performs the pipe and selch control functions described generally above in response to selected I/O requests. However, this program in addition provides a number of further features which improve the flexibility and usefulness of the data pipes 42,44. For example, the speed of the single set of data pipes 42,44 will be sufficient for the needs of many applications. This single set of data pipes 42,44 physically provides only one input and one output. However, users of data pipes will often require many simultaneous yet logically independent pipes, for example, to connect multiple batch steps together. For this reason the program of Appendix 1 simulates many logically independent data pipes which share a common hardware. The program of Appendix 1 maintains a plurality of pairs of data pipe ends, each of which is logically independent and all of which utilize the same hardware. As used herein, the term "data pipe end" signifies such a software generated, logically independent, virtual I/O device.

Each logically independent set of data pipe ends appears in the operating system as two physical devices, for example RP01: and WP01:. The RP01: device may only be read from while the WP01: device may only be written into. Data written into the WP01: device may be read from the RP01: under certain constraints. In a typical application, the program of Appendix 1 can be used to simulate 50 distinct sets of data pipe ends numbered 1 to 50.

Figure 6:
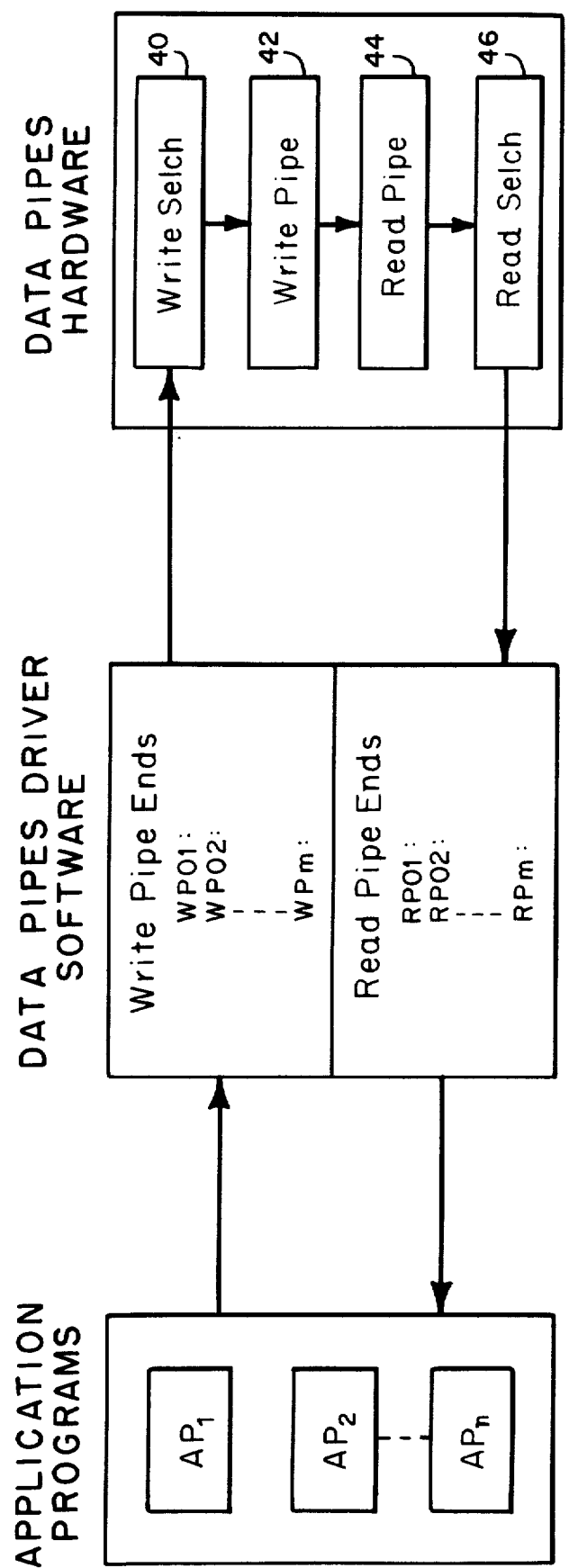
FIG. 6 is an organizational diagram showing the relationship between the application programs, the data pipes software driver, and the data pipes hardware in the embodiment of FIG. 1.

FIG. 6 shows in general terms the manner in which the program of Appendix 1 controls access to the data pipes hardware 40,42,44,46 by the application programs resident in the computer system 10. In FIG. 6 the blocks labeled $AP_1$, $AP_2$ . . . $AP_n$ designate the application programs, each of which may make data transfer requests via any of the write and read data pipe ends WP01:, WP02: . . . WPm: and RP01:, RP02:, . . . RPm: provided by the driver software of Appendix 1. The driver software organizes and pairs data transfer requests such that when complimentary write and read transfer requests have been received on a pair of write and read pipe ends WPx:, RPx:, the data pipes hardware 40,42,44,46 is used to transfer data directly from the application program which has requested data transfer into the write pipe end WPx: to the application program which has requested data transfer from the read pipe end RPx:. Each pair of complimentary write and read pipe ends WPx:, RPx: is logically separate from the other, and each appears as a separate I/O device to the user. Thus, data transfers via pipe ends WP01: and RP01: do not affect or interfere with data transfers via pipe ends WP02: and RP02:.

A further important point is that the program of Appendix 1 has been designed such that the use of the data pipes 42,44 mimics the use of conventional magnetic tape read and write procedures. For this reason, the program of Appendix 1 allows data pipe ends to be used by an application program in much the same manner as magnetic tapes. For example, if the first and second programs in the data blocks 16,20 of FIG. 1 are loaded into the computer system 10 for simultaneous execution and both have been designed to select data pipe end 7 for use, the first program in block 16 would assign a logical unit to WP07: and the second program in block 20 would assign a logical unit to RP07:. After each program has issued a rewind command to its respective pipe end, the two programs may exchange data with normal read and write I/O requests.

In general, the more closely data pipe end operation approximates the operation of magnetic tape, the more transparent data pipe ends will be to the user. Thus, each write pipe end honors the commands REWIND, WRITE, WRITE-FILEMARK and UNLOAD, and each read pipe end honors the commands REWIND, READ, FORWARD-SPACE-RECORD, FORWARD-SPACE-FILEMARK, and UNLOAD. Although the precise implications of these operations are not identical between tapes and pipe ends, reasonable approximation does exist which increases the transparency of the data pipe ends. The term "FILEMARK" is used to designate an end of file symbol. As explained above, the data pipes 42,44 provide no buffering of data transfers and data is transferred directly from the writer's memory into the reader's memory. This approach provides a high efficiency of transfer, but without buffering it is often not practical to support back spacing and rewind operations in a manner similar to magnetic tapes. This is not a significant drawback for a wide range of data processing operations.

The first and second programs in program blocks 16 and 20 which exchange data through the data pipes 42,44 are synchronized by the same operating system mechanism used for all other data transfers in this embodiment. A typical approach is for the operating system to suspend execution of a program which has made an I/O request to a peripheral (tape, disc drive, terminal, or the like) until the transaction is completed. As explained above, when data pipe ends are used to transfer data, a transaction cannot be processed until complimentary read and write requests have been received by the operating system. A read or write request waiting for a complimentary write or read request therefore simply takes longer to complete and results in a longer period during which execution of the requesting program is suspended.

A further point in which the program of Appendix 1 mimics magnetic tape is that the transfer lengths of paired read and write requests do not have to be equal. In fact, it is the minimum length of the two that is actually transferred. The writing program is always led to believe that the full request was transferred. This approach parallels magnetic tape operation in which the writer always transfers the full amount of data while the reader may attempt to read more or less than the actual quantity present.

DATA PIPE PROTOCOL

One advantage of magnetic tape is that the mounting of the physical tape, the writing of data, and its subsequent reading by another program follow a reasonably rigid protocol which coordinates the activity of both programs with the associated hardware. The program of Appendix 1 simulates this protocol, adapted to the particular needs of data pipe control. This program maintains a three-level state variable for each data pipe end, and these variables indicate the current status of the individual pipe ends. In the program of Appendix 1 these states are named ERROR, SYNC and READY. The ERROR state roughly corresponds to a magnetic tape drive which does not have a tape mounted and on line. The SYNC state roughly corresponds to a magnetic tape mounted, on line, and rewound to the beginning. The READY state roughly corresponds to a magnetic tape containing one or more valid records and positioned off of the load point. The states of the pipe ends are controlled in conjunction with the following rules to define the complete pipe protocol.

1. The UNLOAD and REWIND commands always force the associated pipe end into the ERROR and SYNC states, respectively.
2. A record exchange request (WRITE, WRITE-FILEMARK, READ, FORWARD-SPACE-RECORD, FORWARD-SPACE-FILEMARK) to a pipe end currently in the ERROR state is rejected with an error condition.
3. Complimentary pipe ends enter the READY state in unison only when both ends are in the SYNC state and each has a valid record exchange request pending.
4. Complimentary pipe ends may freely exchange records (data, filemarks, skipped records) while both maintain a READY state.
5. Writer WRITE-FILEMARK requests produce the normally expected results for reader READ, FORWARD-SPACE-RECORD and FORWARD-SPACE-FILEMARK requests.
6. A READY write pipe end that has lost READY on its complimentary read end fails to complete the transfer. However, the writer is not prevented with an error condition.
7. A READY read pipe that has lost READY on its complimentary write end automatically drops into the ERROR state. The reader is presented with an error condition. This would correspond to an attempt to read more records than were written on a magnetic tape.

Several additional points concerning data pipe operations deserve mention. After assigning a logical unit to a data pipe end (read or write), it is important that a REWIND command be issued to achieve synchronization. Similarly, the final request to a data pipe end (read or write) should be an UNLOAD command, although this is not essential. No actual data transfer is necessary for FORWARD-SPACE-RECORD and FORWARD-SPACE-FILEMARK reader requests, although they must still be properly paired with the associated writer requests. In generating the operating system to include data pipe ends, it is preferable that an equal number of read and write pipe ends be configured under each physical pipe hardware and selector channel.

DATA PIPE DRIVER INTERNAL OPERATION

The data pipe driver of Appendix 1 is divided conceptually into two parts: DCB197, INITRPIP, CMDRPIP, and TERMRPIP for the read pipe ends and DCB198, INITWPIP, CMDWPIP, and TERMWPIP for the write pipe ends. The operation and programming of these two drivers are nearly identical and will be referenced together as simply the pipe driver in the following description. All of the following comments are applicable to both the read and write pipe drivers except for explicitly mentioned differences.

The device dependent DCB structure is quite simple and contains only three full word items. DCB.CPIP is the address of the complimentary pipe end and is used in coordinating read and write activities. DCB.RTL is the requested transfer length for the pending request at a particular pipe end. DCB.PEST is the current pipe end state of the associated pipe and has the states listed and defined in Table 1.

TABLE 1

| DCB. PEST State | Definition |
|---|---|
| −1 | ERROR State |

TABLE 1-continued

| DCB. PEST State | Definition |
| --- | --- |
| 0 | SYNC State, the last request processed was rewind. |
| +1 | READY State; idle or unpaired request waiting. |
| +2 | READY State; hold and wait for mating connection. |
| +3 | READY State; active DMA transfer in progress. |
| +4 | READY State; selch interrupt received. |
| +5 | READY State; terminate and cleanup with no error. |
| +6 | READY State; transfer error, terminate and cleanup. |

The data pipe driver code may be divided into two major areas: the pipe manager and the data transfer sequence. The pipe manager is responsible for enforcing the specified protocol defined above in complimentary pipe ends and recognizing when an actual data transfer is required. The data transfer sequence accepts paired read/write requests and accomplishes the actual transfer. These two areas are summarized below, and the documentation of Appendix 1 should be consulted for further details.

The pipe manager provides three primary entry points for data requests (INITRPIP and INITWPIP), command requests (CMDRPIP and CMDWPIP), and driver termination (TERMRPIP and TERMWPIP). The first time a pipe driver request is issued after the operating system has been rebooted, the linkage pipe driver subroutine LINKAGE is executed. LINKAGE searches the operating system Device Mnemonic Table for occurrences of read and write pipe devices (DCB197 and DCB198) and establishes cross-linkage of complimentary pipe ends via DCB.CPIP.

Data requests to a read pipe end begin execution at INITRPIP and data requests to a write pipe end begin execution at INITWPIP. The pipe manager enforces the specified protocol by adjusting DCB.PEST and terminating, holding, or scheduling further processing. The pipe manager will manipulate either end of the logical pipe as necessary to enforce the protocol. When the pipe manager determines that valid read and write requests have been paired and an actual data transfer is required, steps are taken (1) to prevent an inadvertent breakage of a logical request pair via a halt I/O request, (2) to coordinate the data transfer with any other logical data pipes or other devices using the selches, and (3) to initiate the data transfer sequence. These three actions are performed upon both pipe ends at the same time.

Command requests to a read pipe end begin execution at CMDRPIP and command requests to a write pipe end begin execution of CMDWPIP. Again, the pipe manager enforces the specified protocol by adjusting DCB.PEST and manipulating queued requests at either end of the logical pipe. It should be noted that no command request is capable of triggering an actual data transfer. The routines TERMRPIP and TERMWPIP or several additional variations of them are entered to terminate a transfer request.

The actual data transfer sequence of the data pipe driver begins at PIPEREAD and PIPEWRIT. By the time these routines are entered, complimentary read/write requests have been paired and full connection has been made in the resource tree. The actual length of data transfer is determined and a time-out safety net is established before actually starting the hardware.

SUMMARY

The data transfer method and apparatus described above provide a number of important advantages. This method and apparatus can be used to transfer data between sequential processing steps at a rate faster than that possible with standard magnetic tapes. Furthermore, tape handling is significantly reduced, and in this way the size of tape libraries and the number of tape errors can be reduced, along with associated processing errors. Other advantages over tapes include reduced human intervention, increased reliability, as well as the possibility of a more nearly parallel processing approach. In many applications, the use of data pipes of the type described above will allow the throughput of computer systems to be increased and will provide faster turnaround on individual processing tasks. They will allow processing tasks with increasingly large volumes of data to be processed with minimal tape handling and personnel requirements. The advantages of these data pipes are particularly useful in seismic processing tasks.

Of course, it should be understood that the foregoing detailed description is provided by way of example, and that a wide range of changes and modifications will be apparent to those skilled in the art. For example, the data pipes described above can readily be adapted for use in other computers, with other types of direct memory access devices, or in computer systems employing multiple processors. Furthermore, details of both hardware and software can readily be varied to suit individual applications. It is, therefore, intended that the foregoing detailed description be regarded as illustrative rather than limiting, and that it be understood that it is the following claims, including all equivalents, which are intended to define the scope of this invention.

APPENDIX 1

```
        BATCH
***********************************
        TITLE DCB197 DCB FOR READ   DATA PIPE SELCH
***********************************
   THIS IS THE DCB USED BY READ   DATA PIPE SELCHES.
        LIST
        NLIBS 8,9,10
        EXTRN COMFIFO
        DPROG DCOD=197

IPEDCB  STRUC                              DCB DEVICE DEPENDENT STRUCTURE
        DS    DCB.FCB
        ALIGN 4
```

```
)CB.PEST DS    4                     PIPE END STATE (-1 TO +6)
*                                    -1=ERROR; SYNCHRONIZATION REQUIRED
*                                     0=SYNC; SYNC REQUEST RECEIVED
*                                     1=READY; IDLE OR UNMATED REQUEST
*                                     2=READY-HOLD; MATE CONNECTION
*                                     3=READY-ACTIVE; DMA STARTED
*                                     4=READY-INTERUPT; INTERUPT RECEIVED
*                                     5=READY-TERMINATE; GOOD CLEANUP
*                                     6=READY-ERROR; ERROR CLEANUP
DCB.CPIP DS    4                     A(COMPLIMENTARY END DCB)
DCB.RTL  DS    4                     REQUESTED TRANSFER LENGTH
         ENDS
*
         DCB   DCOD=197,INIT=INITRPIP,TERM=TERMRPIP,FUNC=CMDRPIP,         1
               IOH=COMIOH,QSR=COMPIPO,EDMA=0,ATRB=5BD4,RECL=0,            2
               SIZE=PIPEDCB,FLGS=DFLG.LNM
*
*    DCB197 DEVICE DEPENDENT SECTIO
*
         ORG   DCB197+DCB.CCB
         DC    Z(CCB197)
         EXTRN Z(CDN2)
         ORG   DCB197+DCB.SDN
         DC    Z(CDN2)
         ORG   DCB197+DCB.PEST
         DAC   -1
         ORG   DCB197+DCB.CPIP
         DAC   0
*
         PURE
*
*    CCB197 REQUIRED TO PROVIDE DCB ADDRESS UPON INTERUPTS
*
CCB197   EQU   *                     CCB USED FOR PIPE INTERUPTS
         DO    CCB,DCB+1+3/4
         DAC   0
         ORG   CCB197+CCB.DCB
         DAC   DCB197
*
         END
         TITLE READ   DATA PIPE DRIVER OVERVIEW AND DOCUMENTATION
INITRPIP PROG  READ   DATA PIPE DRIVER, BACK-TO-BACK B-SELCHES

* * * * * * REMINDER LIST * * * * * * * * * * * * * * * * * * *
*
*
* * * * * * ODDITIES LIST * * * * * * * * * * * * * * * * * * *
*
* A RATHER UNSUAL OPERATIONAL REQUIREMENT OF THE CURRENT
* BACK-TO-BACK B-SELCHES IS THAT
* 1) UNIDIRECTIONAL, SELCH-R CAN ONLY READ, SELCH-W CAN ONLY WRITE,
* 2) START SEQUENCE = ADDRESS READ DEVICE, GO SELCH-R,
*    ADDRESS WRITE DEVICE, GO SELCH-W
* 3) SELCH-W LENGTH MUST BE LESS THAN OR EQUAL TO SELCH-R LENGTH,
* THE DEVICE SHOULD NOT BE REFERENCED WITH A SENSE STATUS TO SET THE
* ADDRESS FLIP / FLOP, AN OUTPUT COMMAND IS RECOMMENDED.
*
* THE RESOURCE CONNECTION STRATEGY (LEAF AND NODE CONNECTION TREE)
* HAS A STRANGE TWIST IN IT WHICH ALLOWS THE PROPER QUEUEING OR
* SCHEDULING OF REQUESTS WHILE REQUIRING ONLY ONE LEAF QUEUE.
* INITIALLY THE EVN.SQS OF A PIPE'S LEAF SPECIFIES SINGLE LEVEL LEAF
* CONNECTION AND THE CORRESPONDING DCB.ESR SPECIFIES A PIPE
* MANAGER (INITRPIP AND CMDRPIP) DRIVER ENTRY.
* THE PIPE MANAGER FOR A SINGLE LOGICAL PIPE END MAY THUS BE ENTERED
* WITHOUT FULL CONNECTION TO THE HARDWARE PIPE SELCH.
* WHEN THE PIPE MANAGER DETERMINES THAT AN ACTUAL DATA TRANSFER
```

```
* IS REQUIRED, EVN.SQS IS CHANGED TO INDICATE MULTIPLE LEVEL CONNECTION,
* THE DCB.ESR IS CHANGED TO INDICATE THE DATA PIPE DRIVER'S
* INITIALIZE TRANSFER ENTRY (PIPEREAD OR PIPEWRIT) AND
* THE NON HALTABLE BIT IN DCB.RPLG IS SET (TO PREVENT THE BREAKAGE
* OF A LOGICAL REQUEST PAIR ON SEPERATE CONNECT PATHS).
* AFTER THIS MODIFICATION IS MADE TO THE COMPLIMENTARY PIPE ENDS
* THEIR RESPECTIVE LEAF IS
* ADDED TO THE SYSTEM QUEUE FOR EVENT SERVICE SCHEDULING.
* WHEN THE HARDWARE DATA PIPE SELCHES BECOME AVAILABLE (THEY ARE
* SHARED BY ALL LOGICAL PIPES SYSGENED UNDER THEM) FULL CONNECTION
* IS ACHIEVED AND THE TRANSFER SEQUENCE IS INITIALIZED.
* AFTER THE DATA TRANSFER HAS COMPLETED, THE DRIVER TERMINATION
* ROUTINE CHANGES EVN.SQS TO IT'S SINGLE LEVEL VALUE.
*
*
* * * * * * COMMENT LIST * * * * * * * * * * * * * * * * * * * *
*
*
* A MIS-MATCH BETWEEN READ AND WRITE TRANSFER LENGTH IS ALLOWED.
* THE MINIMUM OF THE TWO BEING ACTUALLY TRANSFERED.
* THE READER'S RETURNED TRANSFER LENGTH IS THE
* ACTUAL TRANSFER LENGTH AND THE WRITER'S RETURNED TRANSFER LENGTH
* IS THE FULL AMOUNT HE REQUESTED TO BE WRITTEN.
* THIS WOULD CORRESPOND TO WRITING A LONG TAPE RECORD AND
* NOT BEING AWARE OF THE LENGTH ACTUALLY READ AND
* LIKEWISE REQUESTING AN EXTRA LONG READ AND SUBSEQUENTLY CHECKING
* THE  ACTUAL LENGTH OF TRANSFER.
*
* THE NUMBER OF RECORDS READ MAY BE FEWER THAN THE NUMBER OF RECORDS
* WRITTEN WITHOUT CREATING AN ERROR CONDITION.
* THIS WOULD CORRESPOND TO A READER NOT TRAVERSING THE ENTIRE
* INPUT TAPE IF NOT REQUIRED FOR THE READER'S PROCESSING AND
* THE WRITER OF THE TAPE NOT BEING AWARE OF IT.
* ATTEMPTING TO READ MORE RECORDS THAN ARE WRITTEN PRESENTS
* AN ERROR TO THE READER REQUIREING SYNCHRONIZATION TO RECOVER.
*
* THE I/O PROCEED, I/O WAIT, TEST I/O COMPLETE, WAIT I/O COMPLETE,
* UNCONDITIONAL PROCEED, ARE VALID TO ANY PIPE END AND HAVE THEIR
* USUAL INTERPRETATION.
* THE READ PIPE END ONLY ACCEPTS 'READ', 'FSR' (FORWARD-SPACE-RECORD),
* 'FSF' (FORWARD-SPACE-FILE), 'RW' (REWIND) AND 'UN' (UNLOAD)
* FUNCTION CODES.
* ALL OTHERS ARE EITHER REJECTED IMMEDIATELY WITH 'CO' ILLEGAL
* FUNCTION STATUS OR ARE NO-OPERATION (FOLLOWING STANDARD IOH RULES).
* THE WRITE PIPE END ONLY ACCEPTS 'WRITE', 'WFM' (WRITE-FILE-MARK),
* 'RW' (REWIND) AND 'UN' (UNLOAD) FUNCTION CODES.
* ALL OTHERS ARE EITHER REJECTED IMMEDIATELY WITH 'CO' ILLEGAL
* FUNCTION STATUS OR ARE NO-OPERATION (FOLLOWING STANDARD IOH RULES).
* ALL REQUESTS WAITING IN A QUEUE FOR SERVICE ARE SUBJECT TO REMOVAL
* VIA HALT I/O REQUESTS, SUCH AS THOSE GENERATED BY THE TASK CANCEL
* PROCESSER.
*
* VALID 'RECORD EXCHANGE' REQUESTS FOR THE WRITER'S END
* ARE 'WRITE' AND 'WF' (WRITE-FILE-MARK).
* VALID 'RECORD EXCHANGE' REQUESTS FOR THE READER'S END
* ARE 'READ', 'FSR' (FORWARD-SPACE-RECORD) AND
* 'FSF' (FORWARD-SPACE-FILE).
* VALID 'STATE CHANGE' REQUESTS FOR THE READER AND
* WRITER ENDS ARE 'RW' (REWIND) TO ENTER THE SYNC STATE WHICH
* EFFECTIVELY REQUESTS A NEW SYNCHRONIZATION AND
* 'UN' (UNLOAD) TO ENTER THE ERROR STATE WHICH EFFECTIVELY
* TERMINATES A LOGICAL STREAM OF DATA.
*
* ALL REQUESTS ARE SERVICED IN STRICT FIFO ORDER.
* EXPLICIT 'STATE CHANGE' REQUESTS  ARE SERVICED IMMEDIATELY UPON
* REACHING THE TOP OF THEIR QUEUE AND ARE NEVER HELD THERE.
```

```
* LOGICAL RECORD EXCHANGE REQUESTS TO A PIPE END CURRENTLY IN AN
* ERROR STATE ARE ALSO SERVICED IMMEDIATELY.
* LOGICAL RECORD EXCHANGE REQUESTS TO A PIPE END CURRENTLY IN A SYNC
* STATE ARE HELD AS THE TOP QUEUE ITEM UNTIL THE COMPLIMENTARY PIPE
* END ENTERS THE SYNC STATE AND HAS A LOGICAL RECORD EXCHANGE REQUEST
* AT THE TOP OF IT'S QUEUE TO PROCESS.
*
*
* IF YOU BELIEVE A PICTURE IS WORTH A THOUSAND WORDS,
* THE FOLLOWING TRANSITION TABLE SHOULD PROVE A COUNTER EXAMPLE.
* HOWEVER, WITH SOME STUDY IT DOES EFFECTIVELY DESCRIBE THE
* THE VARIOUS WRITER AND READER STATES AND INTERACTIONS.
* THE 'SYNC SYNC OR QUEUE' IS A SPECIAL CASE WHERE IF BOTH ENDS
* ARE IN SYNC STATE AND HAVE A 'RECORD EXCHANGE' REQUEST AT THE TOP
* OF THEIR RESPECTIVE QUEUES, THEN BOTH PIPE ENDS GO TO READY STATE
* AND FURTHER PROCESSING CONTINUES.
* OTHERWISE 'SYNC SYNC OR QUEUE' SIMPLY KEEPS THE REQUEST ON THE
* TOP OF THE CORRESPONDING QUEUE.
* THE LEFT SIDE ROW HEADINGS HAVE BEEN ABBREVIATED DUE TO SPACE
* LIMITATIONS, HOWEVER THEY PARELLEL THE TOP HEADINGS WITH READ AND
* WRITE REVERSED.
*
        EJECT
*
*
*
*                                           TYPE OF WRITER REQUEST
*                                           WHICH IS BEING PROCESSED
*                                           ------------------------
*                                           WRITER WRITER WRITER WRITER
*                                           WRITE  REWIND WFM    UNLOAD
*
*
*         STATES ENCOUNTERED WHILE PROCESSING THE TOP OF READER QUEUE
*         ------------------------------------------------------------
*         READER WRITER              WRITER QUEUE NON-EMPTY
*         IN     QUEUE  ------------------------------------------------
*         ERROR  EMPTY  READER              READER IN READY STATE
*         STATE         IN     ------------------------------------------
*                       SYNC   WRITER WRITER   WRITER IN READY STATE
*                       STATE  IN     IN     ------------------------------
*                              ERROR  SYNC   WRITER WRITER WRITER WRITER
*                              STATE  STATE  WRITE  REWIND WFM    UNLOAD
*
*-----------------------------------------------*****************************
*WRITER                                         *WRITE  REWIND  WFM    UNLOAD*
*IN                                             * 84,E   00,S   84,E   84,E *
*ERROR     RESPONSE DEFINITION                  *                            *
*STATE     E     = GO TO ERROR STATE            *                            *
*-------   S     = GO TO SYNC  STATE            *----------------------------*
*READER    R     = GO TO READY STATE            *QUEUE  REWIND QUEUE  UNLOAD*
*QUEUE     QUEUE = HOLD AT TOP OF QUEUE         *WRITE   00,S   WFM    00,E *
*EMPTY     BLANK = NO CHANGE                    *                            *
*         88    = END OF FILE STATUS            *                            *
*-------   84    = UNRECOVERABLE ERROR STAT*----------------------------*
*WRITER    00    = GOOD (NO ERROR) STATUS       * SYNC  REWIND  SYNC  UNLOAD*
*IN        DATA-X= DATA PIPE TRANSFER           * SYNC   00,S   SYNC   00,E *
*SYNC                                           * OR                   OR   *
*STATE         EXAMPLE                          *QUEUE                 QUEUE*
*-------                    --------            *----------------------------*
*READER    WRITE RESPONSE   WFM                 *WRITE  REWIND  WFM    UNLOAD*
*IN                         00,R                * 00,R   00,S   00,R   00,E *
*ERROR     READ  RESPONSE   READ                *                            *
*STATE                      88,R                *                            *
*-------                    --------            *----------------------------*
*READER                                         *WRITE  REWIND  WFM    UNLOAD*
*IN                                             * 00,R   00,S   00,R   00,E *
```

```
*SYNC                                   *                                          *
*STATE                                  *                                          *
*------*********************************----------------------------------*
*      *             SYNC                  WRITE  REWIND  WFM    UNLOAD*
*      *             SYNC                  DATA-X 00,S    00,R   00,E  *
*READER* READ  QUEUE  OR   READ    READ    READ   READ    READ   READ  *
*READ  * 84,E  READ  QUEUE 84,E    84,E    DATA-X 84,E    88,R   84,E  *
*------*-----------------------------------------------------------------*
*      *                                   WRITE  REWIND  WFM    UNLOAD*
*      *                                   00,R   00,S    00,R   00,E  *
*READER*REWIND REWIND REWIND REWIND REWIND REWIND REWIND  REWIND REWIND*
*REWIND* 00,S  00,S   00,S   00,S   00,S   00,S   00,S    00,S   00,S  *
*------*-----------------------------------------------------------------*
*      *             SYNC                  WRITE  REWIND  WFM    UNLOAD*
*      *             SYNC                  00,R   00,S    00,R   00,E  *
*READER* FSR   QUEUE  OR    FSR     FSR    FSR    FSR     FSR    FSR   *
*FSR   * 84,E  FSR   QUEUE  84,E    84,E   00,R   84,E    88,R   84,E  *
*------*-----------------------------------------------------------------*
*      *             SYNC                  WRITE  REWIND  WFM    UNLOAD*
*      *             SYNC                  00,R   00,S    00,R   00,E  *
*READER* FSF   QUEUE  OR    FSF     FSF    FSF    FSF     FSF    FSF   *
*FSF   * 84,E  FSF   QUEUE  84,E    84,E   QUEUE  84,E    88,R   84,E  *
*------*-----------------------------------------------------------------*
*      *                                   WRITE  REWIND  WFM    UNLOAD*
*      *                                   00,R   00,S    00,R   00,E  *
*READER*UNLOAD QUEUE  UNLOAD UNLOAD UNLOAD UNLOAD UNLOAD  UNLOAD UNLOAD*
*UNLOAD* 00,E  UNLOAD 00,E   00,E   00,E   00,E   00,E    00,E   00,E  *
*------**********************************************************************
*
*       EJECT
*
* * * * * * GENERAL DESCRIPTION * * * * * * * * * * * * * * * *
*
*
*
* PRIMARILY THE PIPE MANAGER SHOULD ACCEPT SIMPLE SEQUENTIAL
* DATA TRANSFER REQUESTS AND REJECT OTHER FUNCTIONS AND COMMANDS.
* HOWEVER IT MAY BE APPROPRIATE TO HONOR A FEW SELECTED COMMAND
* AND FUNCTION SEQUENCES TO MORE CLOSELY MIMICK THE BEHAVIOR
* OF A MAGNETIC TAPE EXCHANGE.
* FOR EXAMPLE, IT WOULD SEEM REASONABLE FOR A TAPE USER TO ISSUE
* A REWIND REQUEST PRIOR TO ANY DATA TRANSFERS TO ENSURE CORRECT TAPE
* POSITIONING.
* THIS CONCEPT IS EMPLOYED HERE TO ENSURE SYNCHRONIZATION BETWEEN
* SUCCESIVE USERS AND TO PREVENT THE INADVERTENT MIXING OF DATA STREAMS.
* EACH NEW USER OF A PIPE END OR LOGICALLY DISTINCT DATA STREAM PASSED
* THROUGH A PIPE BETWEEN TWO ESTABLISHED USERS SHOULD BE PRECEEDED
* BY A REWIND COMMAND.
* A REWIND COMMAND IS IN EFFECT A REQUEST FOR SYNCHRONIZATION BY
* THE USER OF A PIPE END AND PREVENTS ANY FURTHER DATA EXCHANGE UNTIL
* A REWIND COMMAND IS ISSUED AT THE COMPLIMENTARY PIPE END.
* ONCE SYNCHRONIZATION IS ACHEIVED BY THE USERS OF COMPLIMENTARY PIPE
* ENDS, THE OPERATING SYSTEM PIPE DRIVER HONORS SUCCESIVE SVC1
* FUNCTION AND COMMAND REQUESTS UNTIL AN ERROR OCCURS WHICH REQUIRES
* THE PIPE TO BE SYNCHRONIZED AGAIN.
* SUCH ERRORS MAY BE INTENTIONAL, AS IS THE UNLOAD COMMAND, AND SIGNAL
* THE END OF A LOGICAL STREAM OF DATA.
* OTHER ERRORS MAY BE INADVERTENT, SUCH AS A READER'S READ BEING PAIRED
* WITH A WRITER'S REWIND
*
*
*
*        SVC 1 STATUS ERROR CODE DESCRIPTION ( XX = SELCH/PIPE ADDR )
*   '9999'    YOU GOT THE BOOBY PRIZE, A SITUATION HAS ARISEN WHICH
```

```
*                     WAS NOT THOUGHT POSSIBLE.  PRESENT AND VALIDATE THIS
*                     ERROR TO RANDY SELZLER AND COLLECT YOUR FREE BEER.
*        'A0XX'       SELCH GIVES FALSE SYNC ERROR, DEVICE UNAVAILABLE
*        'A100'       PIPE SYSTEM LINKAGE FAILURE, SYGEN ERROR!
*        '82XX'       DEVICE TIMEOUT DURING TRANSFER, HARDWARE FAILURE
*        '83XX'       BAD SELCH STATUS AFTER TRANSFER TERMINATION
*        '8483'       USER'S ADDRESS ALIGNMENT OR LENGTH ERROR
*        '8484'       UNRECOVERABLE, CONFLICTING SEQUENCE OF USER'S REQUESTS
*
*        *** CUP CONFIGURATION ***
*             ALL DEVICE STATEMENTS REFRENCING THE SAME PHYSICAL PIPE
*        HARDWARE (PAIR OF BACK-TO-BACK B-SELCHES) SHOULD SPECIFY THE
*        SAME DEVICE ADDRESS.
*
*
*             1:F4,0                 1ST HARDWARE READ  PIPE SELCH
*             2:0,0                  DUMMY CONTROLLER
*             3 RP01:80,197          READ  PIPE NO. 1
*             3 RP02:80,197          READ  PIPE NO. 2
*             3 RP03:80,197          READ  PIPE NO. 3
*             3 RP04:80,197          READ  PIPE NO. 4
*
*             1:F3,0                 1ST HARDWARE WRITE PIPE SELCH
*             2:0,0                  DUMMY CONTROLLER
*             3 WP01:81,198          WRITE PIPE NO. 1
*             3 WP02:81,198          WRITE PIPE NO. 2
*             3 WP03:81,198          WRITE PIPE NO. 3
*             3 WP04:81,198          WRITE PIPE NO. 4
*
*             1:F8,0                 2ND HARDWARE READ  PIPE SELCH
*             2:0,0                  DUMMY CONTROLLER
*             3 RP05:32,197          READ  PIPE NO. 5
*             3 RP06:32,197          READ  PIPE NO. 6
*             3 RP07:32,197          READ  PIPE NO. 7
*             3 RP08:32,197          READ  PIPE NO. 8
*
*             1:F7,0                 2ND HARDWARE WRITE PIPE SELCH
*             2:0,0                  DUMMY CONTROLLER
*             3 WP05:33,198          WRITE PIPE NO. 5
*             3 WP06:33,198          WRITE PIPE NO. 6
*             3 WP07:33,198          WRITE PIPE NO. 7
*             3 WP08:33,198          WRITE PIPE NO. 8
'        THE FOLLOWING SUMMARIZES ENTRY POINTS SPECIFIED BY THE DCB-S.
'
'             INITRPIP ESR FOR FUNCTION PIPE MANAGER REQUESTS
'             CMDRPIP  ESR FOR COMMAND  PIPE MANAGER REQUESTS
'             TERMRPIP ESR FOR GENERAL REQUEST TERMINATION
'
'
             LIST
             MLIBS 8,9,10
             $REGS$
             $TCB$
             $DCB$
             $CCB
             $EVN
*
             LIST
             TITLE DATA PIPE DEVICE DEPENDENT STRUCTURE AND CONTROL TABLE
*
PIPEDCB   STRUC                      DCB DEVICE DEPENDENT STRUCTURE
          DS    DCB.FCB
          ALIGN 4
DCB.PEST  DS    4                    PIPE END STATE (-1 TO +6)
*                                    -1=ERROR; SYNCHRONIZATION REQUIRED
```

```
*                                  0=SYNC; SYNC REQUEST RECEIVED
*                                  1=READY; IDLE OR UNMATED REQUEST
*                                  2=READY-HOLD; MATE CONNECTION
*                                  3=READY-ACTIVE; DMA STARTED
*                                  4=READY-INTERUPT; INTERUPT RECEIVED
*                                  5=READY-TERMINATE; GOOD CLEANUP
*                                  6=READY-ERROR; ERROR CLEANUP
DCB.CPIP  DS     4                 A(COMPLIMENTARY END DCB)
DCB.RTL   DS     4                 REQUESTED TRANSFER LENGTH
          ENDS
*
*
*         TIME OUT CONSTANTS IN USE (SECONDS)
TOCPIPE   EQU    60                SAFETY NET FOR PIPE SELCH DMA
TOCPAIR   EQU    600               SAFETY NET FOR PAIRING OF REQUESTS
*
*
*         COMMONLY USED CONSTANTS
ZERO      DC     X'0'              HALFWORD OF ZERO
ONE       DC     X'1'              HALFWORD OF ONE
MINUS1    DC     -1                HALFWORD OF -1
*
*         COMMONLY USED OUTPUT COMMAND BYTES.
DISARM    DB     X'C0'             DISARM  PIPE INTERUPTS
DISABLE   DB     X'40'             DISABLE PIPE INTERUPTS
ENABLE    DB     X'80'             ENABLE  PIPE INTERUPTS
SELCHSTP  DB     X'48'             STOP SELCH
SELCHWR   DB     X'14'             START SELCH WRITING
SELCHRD   DB     X'34'             START SELCH READING
*
*
*
          ENTRY  INITRPIP,CMDRPIP,TERMRPIP
          EXTRN  DIRDONE,IODONE2,IODONE
          EXTRN  ISPTAB,SQ,III,TOCHON,TOCHOFF
          EXTRN  ADCHK,EVMOD,EVRTE,EVREL
          EXTRN  SQS.SLV,SQS.MLV
*
          IMPUR
***************************************
          TITLE INITRPIP ESR INITIALIZATION FOR FUNCTION MANAGER REQUESTS
          ALIGN 4
***************************************
* * *     ESR INITRPIP, FUNCTION READ REQUESTS TO PIPE MANAGER
* * *     ENTRY SPECIFICATIONS:
* * *             UD = A(DCB)
* * *             UF = A(LEAF)
* * *     EXIT SPECIFICATIONS:
* * *             EXIT TO IODONE2 OR DIRDONE
***************************************
*
INITRPIP  EQU    *
* READ PIPE QUEUE NON-EMPTY ? YES, THEN
*   SIMPLY ADD THIS REQUEST TO READ QUEUE AND EXIT.
*   (NOTE THIS IS AUTOMATICALLY DONE BY THE IOH BEFORE DRIVER ENTRY)
          BAL    RA,LINKAGE        CHECK DCB LINKAGE
*   INITIALIZE SOME DCB ENTRIES
          LA     RE,PIPEREAD       PREPARE TO START READ TRANSFER
          BAL    R8,EVMOD          DO IT WITH EVMOD FOR COMPATEBILITY
*                                  R9 DESTROYED !
          LIS    R8,0
          ST     R8,DCB.LLXF(RD)   ZERO TRANSFER LENGTH
          STH    R8,DCB.STAT(RD)   ZERO STATUS
*   DETERMINE TRANSFER LENGTH FOR COMPARISON AND USER RETURN.
          L      R8,DCB.SADR(RD)   CALCULATE REQUESTED TRANFER LENGTH
          THI    R8,1              REQUIRE HALFWORD ALIGNMENT
          BNZ    INITERR3          COMPLAIN IF NOT
```

```
            NI      R8,Y'00FFFFFF'       PURIFY IT
            L       RA,DCB.EADR(RD)
*****       THI     RA,1                 REQUIRE EVEN NUMBER OF BYTES LENGTH
*****       BZ      INITERR3             COMPLAIN IF NOT
            NI      RA,Y'00FFFFFF'       PURIFY IT
            SR      RA,R8                DIFFERENCE
            ST      RA,DCB.RTL(RD)       AND SAVE IT FOR FUTURE USE
*    INITIALIZE SOME REGISTERS
            L       R7,DCB.CPIP(RD)      A(COMPLIMENTARY DCB)
            L       RE,DCB.LEAF(R7)      A(COMPLIMENTARY LEAF)
*
* PROCESS READER PIPE REQUEST AT TOP OF QUEUE
* READER IN ERROR STATE ? YES, THEN
*    '8484' UNRECOVERABLE ERROR STATUS, AND TERMINATE.
            L       R8,DCB.PEST(RD)      READER END STATE
            BM      INITERR4             ERROR ? YES, UNRECOVERABLE
* PROCESS READER PIPE REQUEST AT TOP OF QUEUE.
* READER NOT IN ERROR STATE !
* WRITE PIPE QUEUE EMPTY OR CHANGING ? YES, THEN
*    SIMPLY KEEP THIS REQUEST AT TOP OF QUEUE AND EXIT.
            L       R8,EVN.DCB(RE)       WRITER LEAF OWNER
            BZ      HOLDQUE              ZERO ? YES, THEN NO PENDING REQUESTS
            LHL     R8,DCB.TOUT(R7)      'STABLE' TIMEOUT CONSTANT ?
            CHI     R8,X'7FFF'
            BNE     HOLDQUE
*                   WRITE PIPE QUEUE NON-EMPTY AND STABLE !
*                   THIS IMPLIES THAT THE WRITER IS IN EITHER SYNC
*                   OR READY STATE AND A WRITER WRITE OR WRITER WP
*                   IS STUCK AT THE TOP OF THE WRITER QUEUE WHICH
*                   CAN ONLY BE BROKEN LOSE BY THE READER (OR
*                   A HALT I/O REQUEST FROM THE WRITER SIDE).
* PROCESS READER PIPE REQUEST AT TOP OF QUEUE.
* READER NOT IN ERROR STATE !
* WRITE PIPE QUEUE NON-EMPTY AND STABLE !
* READER IN SYNC STATE ? YES, THEN
*    WRITER IN READY STATE ? YES, THEN
*       PURGE WRITER QUEUE WITH ZERO STATUS AND
*       SIMPLY KEEP THIS REQUEST AT TOP OF QUEUE AND EXIT.
*    WRITER IN SYNC STATE ? YES, THEN
*       READER SYNC, WRITER SYNC AND FIRST LEGITIMATE PAIR ARE MATED !
*       READER AND WRITER TO READY-HOLD STATE, AND GOTO ...
*    WRITER IN ERROR STATE IMPLIED !
*    MY LOGIC IS INCORRECT BECAUSE THIS SHOULD NEVER HAPPEN !
            L       R8,DCB.PEST(RD)      READER END STATE
            BNZ     AAAA                 NOT SYNC ? YES, THEN GOTO...
            L       R8,DCB.PEST(R7)      WRITER STATE
            BM      INITERR1             ERROR ? CRASH CRASH CRASH
            BP      AAAA1                READY ? YES, THEN GOTO...
            LIS     R8,1                 1
            ST      R8,DCB.PEST(RD)      READER TO READY-IDLE
            ST      R8,DCB.PEST(R7)      WRITER TO READY-IDLE
            LB      R8,DCB.FC(R7)        EXAMINE WRITER FUNCTION CODE
            B       CCCC                 AND GO TO...
AAAA1       EQU     *                    WRITER READY STATE
            LIS     R8,1
            STH     R8,DCB.TOUT(R7)      TIMEOUT TO PURGE WRITER
            B       HOLDQUE              AND KEEP READ REQUEST AT QUEUE TOP
*
AAAA        EQU     *
* PROCESS READER PIPE REQUEST AT TOP OF QUEUE.
* READER NOT IN ERROR STATE !
* WRITE PIPE QUEUE NON-EMPTY AND STABLE !
* READER NOT IN SYNC STATE !
* (READER IN READY STATE IMPLIED !)
* WRITER IN ERROR STATE ? YES, THEN
*    '8484' UNRECOVERABLE, ERROR STATE, AND TERMINATE.
```

```
          L     RC,DCB.PEST(R7)     WRITER END STATE
          BNP   INITERR4            NOT READY ? YES, UNRECOVERABLE...
* PROCESS READER PIPE REQUEST AT TOP OF QUEUE.
* READER NOT IN ERROR STATE !
* WRITE PIPE QUEUE NON-EMPTY AND STABLE !
* READER NOT IN SYNC STATE !
* (READER IN READY STATE IMPLIED !)
* WRITER NOT IN ERROR STATE !
* WRITER IN SYNC STATE ? YES, THEN
*    '8400' UNRECOVERABLE ERROR STATUS, AND TERMINATE.
*         *PERFORMED IN PREVIOUS SECTION*
* PROCESS READER PIPE REQUEST AT TOP OF QUEUE.
* READER NOT IN ERROR STATE !
* WRITE PIPE QUEUE NON-EMPTY AND STABLE !
* READER NOT IN SYNC STATE !
* (READER IN READY STATE IMPLIED !)
* WRITER NOT IN ERROR STATE !
* WRITER NOT IN SYNC STATE !
* (WRITER IN READY STATE IMPLIED !)
* READER READ, INTERPRET PAIRED WRITER FUNCTION CODE AND
* PROCESS MATED PAIRS ACCORDINGLY
          LB    R8,DCB.FC(R7)       EXAMINE WRITER FUNCTION CODE
          CHI   R8,X'C0'            REWIND ?
          BNE   BBBB                NO ? THEN GOTO...
          B     INITERR1
*         LIS   R8,0
*         ST    R8,DCB.PEST(R7)     WRITER TO SYNC STATE
*         LIS   R8,1
*         STH   R8,DCB.TOUT(R7)     TIMEOUT TO PURGE WRITER
*         B     INITERR4            AND UNRECOVERABLE ERROR
BBBB      EQU   *                   NOT REWIND !
          CHI   R8,X'D0'            UNLOAD ?
          BNE   CCCC                NO ? THEN GOTO...
          B     INITERR1
*         LCS   R8,1                -1
*         ST    R8,DCB.PEST(R7)     WRITER TO ERROR STATE
*         LIS   R8,1
*         STH   R8,DCB.TOUT(R7)     TIMEOUT TO PURGE WRITER
*         B     INITERR4            AND UNRECOVERABLE ERROR
CCCC      EQU   *                   NOT UNLOAD !
          CHI   R8,X'88'            WRITE FILE MARK ?
          BNE   DDDD                NO ? THEN GOTO...
          LIS   R8,1
          STH   R8,DCB.TOUT(R7)     TIMEOUT TO PURGE WRITER
          LHI   R8,X'8800'
          STH   R8,DCB.STAT(RD)     READER READ STATUS = '8800' EOF
          B     IODONE2             AND EXIT
DDDD      EQU   *                   NOT WRITE FILE MARK
**** AMAZING **** WE HAVE AN ACTUAL DATA TRANSFER REQUEST PAIRED !
          LA    R8,SQS.MLV          MULTI LEVEL SQS CONNECT
          ST    R8,EVN.SQS(RE)      INTO WRITER'S LEAF
          ST    R8,EVN.SQS(RF)      INTO READER'S LEAF
          LI    R8,IOBF.NHB         NON-HALTABLE BIT
          SBT   R8,DCB.RFLG(R7)     WRITER'S
          SBT   R8,DCB.RFLG(RD)     READER'S
          ATL   RE,SQ               SCHEDULE WRITER
          ATL   RF,SQ               SCHEDULE READER
          B     HOLDQUE             AND EXIT
*
**********************************
          TITLE CMDRPIP   ESR INITIALIZATION FOR COMMAND MANAGER REQUESTS
          ALIGN 4
**********************************
* * *     ESR CMDRPIP, COMMAND REQUESTS TO PIPE MANAGER
* * *     ENTRY SPECIFICATIONS:
* * *          UD  = A(DCB)
* * *          UF  = A(LEAF)
```

```
***    EXIT SPECIFICATIONS:
***             EXIT TO IODONE2 OR DIRDONE
***************************************
*
CMDRPIP  EQU   *
* READ PIPE QUEUE NON-EMPTY ? YES, THEN
*   SIMPLY ADD THIS REQUEST TO READ QUEUE AND EXIT.
*   (NOTE THIS IS AUTOMATICALLY DONE BY THE IOH BEFORE DRIVER ENTRY)
         BAL   R4,LINKAGE              CHECK DCB LINKAGE
* INITIALIZE SOME DCB ENTRIES
*               NOTE - FOLLOWING IS REQUIRED TO PURGE REQUESTS
         LA    RE,PIPEREAD             PREPARE TO START READ TRANSFER
         BAL   R8,EVMOD                DO IT WITH EVMOD FOR COMPATEBILITY
*                                      R9 DESTROYED !
         LIS   R8,0
         STH   R8,DCB.STAT(RD)         ZERO STATUS
* INITIALIZE SOME REGISTERS
         L     R7,DCB.CPIP(RD)         A(COMPLIMENTARY DCB)
         L     RE,DCB.LEAF(R7)         A(COMPLIMENTARY LEAF)
*
*  NOW DETERMINE THE PARTICULAR COMMAND (RW, FSR, FSF, UNLOAD)
         LB    R8,DCB.FC(RD)           READER'S COMMAND FUNCTION CODE
         CHI   R8,X'C0'                REWIND ?
         BNE   MMMM                    NO ? THEN GOTO...
         LIS   R8,0
         ST    R8,DCB.PEST(RD)         READER STATE = SYNC
         B     NNNN                    AND PURGE WRITER
MMMM     EQU   *
         CHI   R8,X'D0'                UNLOAD ?
         BNE   0000                    NO ? THEN GOTO...
         LCS   R8,1
         ST    R8,DCB.PEST(RD)         READER STATE = ERROR
*                                      AND FALL THROUGH TO PURGE WRITER
NNNN     EQU   *
*
* WRITE PIPE QUEUE EMPTY OR CHANGING ? YES, THEN
*   SIMPLY TERMINATE.
         L     R8,EVN.DCB(RE)          WRITER LEAF OWNER
         BZ    IODONE2                 ZERO ? YES, THEN NO PENDING REQUESTS
         LHL   R8,DCB.TOUT(R7)         'STABLE' TIMEOUT CONSTANT ?
         CHI   R8,X'7FFF'
         BNE   IODONE2
*              WRITE PIPE QUEUE NON-EMPTY AND STABLE !
*              THIS IMPLIES THAT THE WRITER IS IN EITHER SYNC
*              OR READY STATE AND A WRITER WRITE OR WRITER WF
*              IS STUCK AT THE TOP OF THE WRITER QUEUE WHICH
*              CAN ONLY BE BROKEN LOSE BY THE READER (OR
*              A HALT I/O REQUEST FROM THE WRITER SIDE).
*
* WRITE PIPE QUEUE NON-EMPTY AND STABLE !
* WRITER IN SYNC STATE ? YES, THEN
*   READER'S COMMAND (RW OR UNLOAD) SIMPLY TERMINATES.
* WRITER IN READY STATE ? YES, THEN
*   PURGE WRITER REQUEST WITH ZERO STATUS AND
*   READER'S COMMAND (RW OR UNLOAD) TERMINATES
* WRITER IN ERROR STATE IMPLIED !
* MY LOGIC IS INCORRECT BECAUSE THIS SHOULD NEVER HAPPEN !
         L     R8,DCB.PEST(R7)         WRITER STATE
         BZ    IODONE2                 SYNC ? YES, SIMPLY TERMINATE
         BM    INITERR1                ERROR ? CRASH CRASH CRASH
         LIS   R8,1
         STH   R8,DCB.TOUT(R7)         TIMEOUT TO PURGE WRITER
         B     IODONE2                 AND TERMINATE READER'S COMMAND
*
*
0000     EQU   *                       NOT UNLOAD
```

```
*    THAT TAKES CARE OF THE SIMPLE IMMEDIATE COMMANDS
*    NOW THE READER'S COMMAND IS LIMITED TO FSR OR FSF.
*
* PROCESS READER PIPE REQUEST AT TOP OF QUEUE
* READER IN ERROR STATE ? YES, THEN
*    '8484' UNRECOVERABLE ERROR STATUS, AND TERMINATE.
            L     R8,DCB.PEST(RD)    READER END STATE
            BM    INITERR4           ERROR ? YES, UNRECOVERABLE
* PROCESS READER PIPE REQUEST AT TOP OF QUEUE.
* READER NOT IN ERROR STATE !
* WRITE PIPE QUEUE EMPTY OR CHANGING ? YES, THEN
*    SIMPLY KEEP THIS REQUEST AT TOP OF QUEUE AND EXIT.
            L     R8,EVN.DCB(RE)     WRITER LEAF OWNER
            BZ    HOLDQUE            ZERO ? YES, THEN NO PENDING REQUESTS
            LHL   R8,DCB.TOUT(R7)    'STABLE' TIMEOUT CONSTANT ?
            CHI   R8,X'7FFF'
            BNE   HOLDQUE
*                 WRITE PIPE QUEUE NON-EMPTY AND STABLE !
*                 THIS IMPLIES THAT THE WRITER IS IN EITHER SYNC
*                 OR READY STATE AND A WRITER WRITE OR WRITER WF
*                 IS STUCK AT THE TOP OF THE WRITER QUEUE WHICH
*                 CAN ONLY BE BROKEN LOSE BY THE READER (OR
*                 A HALT I/O REQUEST FROM THE WRITER SIDE).
* PROCESS READER PIPE REQUEST AT TOP OF QUEUE.
* READER NOT IN ERROR STATE !
* WRITE PIPE QUEUE NON-EMPTY AND STABLE !
* READER IN SYNC STATE ? YES, THEN
*    WRITER IN READY STATE ? YES, THEN
*       PURGE WRITER QUEUE WITH ZERO STATUS AND
*       KEEP THIS REQUEST AT TOP OF QUEUE AND EXIT.
*    WRITER IN SYNC STATE ? YES, THEN
*       READER SYNC, WRITER SYNC AND FIRST LEGITIMATE PAIR ARE MATED !
*       READER AND WRITER TO READY-HOLD STATE, AND GOTO ...
*    WRITER IN ERROR STATE IMPLIED !
*       MY LOGIC IS INCORRECT BECAUSE THIS SHOULD NEVER HAPPEN !
            L     R8,DCB.PEST(RD)    READER END STATE
            BNZ   PPPP               NOT SYNC ? YES, THEN GOTO...
            L     R8,DCB.PEST(R7)    WRITER STATE
            BM    INITERR1           ERROR ? CRASH CRASH CRASH
            BP    PPPP1              READY ? YES, THEN GOTO...
            LIS   R8,1               1
            ST    R8,DCB.PEST(RD)    READER TO READY-IDLE
            ST    R8,DCB.PEST(R7)    WRITER TO READY-IDLE
            LB    R8,DCB.FC(R7)      EXAMINE WRITER FUNCTION CODE
            B     RRRR               AND GO TO...
PPPP1       EQU   *                  WRITER READY STATE
            LIS   R8,1
            STH   R8,DCB.TOUT(R7)    TIMEOUT TO PURGE WRITER
            B     HOLDQUE            AND KEEP READ REQUEST AT QUEUE TOP
*
PPPP        EQU   *
* PROCESS READER PIPE REQUEST AT TOP OF QUEUE.
* READER NOT IN ERROR STATE !
* WRITE PIPE QUEUE NON-EMPTY AND STABLE !
* READER NOT IN SYNC STATE !
* (READER IN READY STATE IMPLIED !)
* WRITER IN ERROR STATE ? YES, THEN
*    '8484' UNRECOVERABLE, ERROR STATE, AND TERMINATE.
            L     RC,DCB.PEST(R7)    WRITER END STATE
            BNP   INITERR4           NOT READY ? YES, UNRECOVERABLE...
* PROCESS READER PIPE REQUEST AT TOP OF QUEUE.
* READER NOT IN ERROR STATE !
* WRITE PIPE QUEUE NON-EMPTY AND STABLE !
* READER NOT IN SYNC STATE !
* (READER IN READY STATE IMPLIED !)
* WRITER NOT IN ERROR STATE !
```

```
* WRITER IN SYNC STATE ? YES, THEN
*   '8400' UNRECOVERABLE ERROR STATUS, AND TERMINATE.
*       *PERFORMED IN PREVIOUS SECTION*
* PROCESS READER PIPE REQUEST AT TOP OF QUEUE.
* READER NOT IN ERROR STATE !
* WRITE PIPE QUEUE NON-EMPTY AND STABLE !
* READER NOT IN SYNC STATE !
* (READER IN READY STATE IMPLIED !)
* WRITER NOT IN ERROR STATE !
* WRITER NOT IN SYNC STATE !
* (WRITER IN READY STATE IMPLIED !)
* READER COMMAND (FSR OR FSP),
* INTERPRET PAIRED WRITER FUNCTION CODE,
* PROCESS MATED PAIRS ACCORDINGLY
          LB    R8,DCB.FC(R7)       EXAMINE WRITER FUNCTION CODE
          CHI   R8,X'C0'            REWIND ?
          BNE   QQQQ                NO ? THEN GOTO...
          B     INITERR1
*         LIS   R8,0
*         ST    R8,DCB.PEST(R7)     WRITER TO SYNC STATE
*         LIS   R8,1
*         STH   R8,DCB.TOUT(R7)     TIMEOUT TO PURGE WRITER
*         B     INITERR4            AND UNRECOVERABLE ERROR
QQQQ      EQU   *                   NOT REWIND !
          CHI   R8,X'D0'            UNLOAD ?
          BNE   RRRR                NO ? THEN GOTO...
          B     INITERR1
*         LCS   R8,1                -1
*         ST    R8,DCB.PEST(R7)     WRITER TO ERROR STATE
*         LIS   R8,1
*         STH   R8,DCB.TOUT(R7)     TIMEOUT TO PURGE WRITER
*         B     INITERR4            AND UNRECOVERABLE ERROR
RRRR      EQU   *                   NOT UNLOAD !
          CHI   R8,X'88'            WRITE FILE MARK ?
          BNE   SSSS                NO ? THEN GOTO...
          LIS   R8,1
          STH   R8,DCB.TOUT(R7)     TIMEOUT TO PURGE WRITER
          LHI   R8,X'8800'          READER READ STATUS = EOF
          STH   R8,DCB.STAT(RD)     WRITER WF STATUS = 0, GOOD
          B     IODONE2             AND EXIT
SSSS      EQU   *                   NOT WRITE FILE MARK
*         WRITER'S WRITE IMPLIED
          LIS   R8,1
          STH   R8,DCB.TOUT(R7)     TIMEOUT TO PURGE WRITER
          LB    R8,DCB.FC(RD)       READER COMMAND FUNCTION CODE
          CHI   R8,X'84'            FSP (FORWARD SPACE FILE MARK)?
          BE    HOLDQUE             YES ? KEEP FSP ON READER Q TOP
          B     IODONE2             FSR ? THEN TERMINATE
*
*
*******************************
*
*
* THE FOLLOWING CHECKS THE CROSS LINKAGE OF COMPLIMENTARY
* DCB PAIRS AND IF NECCESARY PERFORMS INITIALIZATION.
* INITIALIZATION IS NECCESARY ONLY ONCE UPON THE FIRST PIPE ACCESS
* AND IS EFFECTIVE FOR ALL PIPE ENDS THERE AFTER.
* INITIALIZATION INVOLVES FINDING ALL 197 AND 198 DCB (IN THE ORDER
* FOUND IN THE SYSTEM 'DMT' TABLE), PAIRING THEIR DCB.CPIP ENTRIES,
* INITIALIZING THEIR LEAF EVN.SQS TO SQS.SLV (SINGLE LEVEL
* CONNECTION) AND DISCONNECTING LEVEL 2 UP (WHICH IS INADVERTENTLY
* ACCOMPLISHED DURING THIS FIRST ACCESS).
* IF A PIPE END IS 'DANGLING' (A SYSGEN CUP CONFIGURATION ERROR
* WHICH LEAVES NO COMPLIMENTARY DCB AVAILABLE)
* DCB.CPIP IS SET TO MINUS ONE.
* ANY ACCESS TO SUCH A PIPE LEADS TO AN '8484' ERROR.
```

```
T197DCB   EQU    1                        A(CURRENT DCB TO TEST)
T198DCB   EQU    2                        A(CURRENT DCB TO TEST)
T197DMT   EQU    3                        A(CURRENT DMT ENTRY UNDER TEST)
T198DMT   EQU    4                        A(CURRENT DMT ENTRY UNDER TEST)
DCOD197   EQU    5                        DCB 197 DCOD VALUE
DCOD198   EQU    6                        DCB 198 DCOD VALUE
TEMP      EQU    7                        TEMPORARY REGISTER
ILINK     EQU    8                        INTERNAL LINK REGISTER
ASQSSLV   EQU    9                        A(SQS.SLV)
LINK      EQU    10                       LINKAGE LINK REGISTER
          EXTRN  DMT

LINKAGE   EQU    *
          L      TEMP,DCB.CPIP(RD)        HAVE WE BEEN INITIALIZED ?
          BPR    RA                       YES ? SIMPLY RETURN
          BM     INITERR6                 DANGLING PIPE END ?

*         PIPE DCB INITIALIZATION REQUIRED.
          LIS    RE,2
          BAL    E8,EVREL                 DISCONNECT AT LEVEL 2 UP

LA     T197DMT,DMT              STARTING TEST 197 DMT ENTRY
          SIS    T197DMT,8
          LHI    DCOD197,197              DCB 197 DCOD VALUE
          LA     T198DMT,DMT              STARTING TEST 198 DMT ENTRY
          SIS    T198DMT,8
          LHI    DCOD198,198              DCB 198 DCOD VALUE
          LA     ASQSSLV,SQS.SLV          A(SQS.SLV)

FIND197   EQU    *
          AIS    T197DMT,8                INCREMENT TO NEXT DMT ENTRY
          L      T197DCB,4(T197DMT)       NEW DCB TO TEST
          BM     FIND197                  DUMMY DMT DCB ?
          BZ     FIND198                  END OF DMT ?
          CLB    DCOD197,DCB.DCOD(T197DCB) IS IT A 197 DCB ?
          BNE    FIND197                  NO ? TRY AGAIN
FIND198   EQU    *
          AIS    T198DMT,8                INCREMENT TO NEXT DMT ENTRY
          L      T198DCB,4(T198DMT)       NEW DCB TO TEST
          BM     FIND198                  DUMMY DMT DCB ?
          BZ     DANG197                  END OF DMT ?
          CLB    DCOD198,DCB.DCOD(T198DCB) IS IT A 198 DCB ?
          BNE    FIND198                  NO ? TRY AGAIN

DANG198   EQU    *                        CHECK FOR DANGLING 198 DCB'S
          LR     T197DCB,T197DCB
          BP     COMPLEM                  GOOD COMPLIMENTARY DCB PAIR
          LCS    TEMP,1
          ST     TEMP,DCB.CPIP(T198DCB)
          B      FIND198                  FIND ANY MORE DANGLING 198'S

DANG197   EQU    *                        CHECK FOR DNAGLING 197 DCB'S
          LR     T197DCB,T197DCB
          BNP    LINKAGE                  EXIT LINKAGE
          LCS    TEMP,1
          ST     TEMP,DCB.CPIP(T197DCB)
          SIS    T198DMT,8                FAKE THE LAST 198 DMT
          B      FIND197                  FIND ANY MORE DANGLING 198'S

COMPLEM   EQU    *
*         COMPLIMENTARY DCB  FOUND, FIX THINGS UP
          ST     T197DCB,DCB.CPIP(T198DCB)
          L      TEMP,DCB.LEAF(T197DCB)
          ST     ASQSSLV,EVN.SQS(TEMP)
```

```
         ST    T198DCB,DCB.CPIP(T197DCB)
         L     TEMP,DCB.LEAF(T198DCB)
         ST    ASQSSLV,EVN.SQS(TEMP)
         B     FIND197
*
*
***************************************
*
*
HOLDQUE  EQU   *
*    THE CURRENT TOP OF QUEUE REQUEST IS HELD AS 'STABLE'
         BAL   R8,TOCHON                PUT ON TIMEOUT CHAIN
*                                       RA DESTROYED !
*        NOTE: TOCHON LEAVES '7FFF' IN DCB.TOUT ('STABLE')
         B     DIRDONE                  AND EXIT INITIALIZATION
*
INITERR1 EQU   *
*    A CONDITION HAS ARISEN THAT WAS BELIEVED IMPOSSIBLE
         LCS   R8,1                     -1
         ST    R8,DCB.PEST(RD)          READ END STATE = ERROR
         LIS   R8,0
         ST    R8,DCB.LLXF(RD)          ZERO TRANSFER LENGTH
         LHI   R8,X'9999'               STATUS = ILLEGAL FUNCTION
         STH   R8,DCB.STAT(RD)
         B     IODONE2                  AND EXIT
*
INITERR2 EQU   *
*    SELCH GIVES FALSE SYNC ERROR
         LHI   R8,X'A000'               STATUS = DEVICE UNAVAILABLE
         OH    R8,DCB.SDN(RD)           OR THE SELCH ADDR INTO LOW BITS
         STH   R8,DCB.STAT(RD)
         B     TERMERR3                 AND GOTO...
*
INITERR3 EQU   *
*    USER'S BUFFER ADDRESS NOT HALFWORD ALIGNED OR ODD BYTE COUNT ERROR
         LCS   R8,1                     -1
         ST    R8,DCB.PEST(RD)          READ END STATE = ERROR
         LIS   R8,0
         ST    R8,DCB.LLXF(RD)          ZERO TRANSFER LENGTH
         LHI   R8,X'8483'               STATUS = UNRECOVERABLE ERROR
         STH   R8,DCB.STAT(RD)
         B     IODONE2                  AND EXIT
*
INITERR4 EQU   *
*    UNRECOVERABLE ERROR IN LOGICAL SEQUENCE OF USER REQUESTS
         LCS   R8,1                     -1
         ST    R8,DCB.PEST(RD)          READ END STATE = ERROR
         LIS   R8,0
         ST    R8,DCB.LLXF(RD)          ZERO TRANSFER LENGTH
         LHI   R8,X'8484'               STATUS = UNRECOVERABLE ERROR
         STH   R8,DCB.STAT(RD)
         B     IODONE2                  AND EXIT
*
INITERR5 EQU   *
*    DEVICE GIVES FALSE SYNC ERROR
         LHI   R8,X'A003'               STATUS = DEVICE UNAVAILABLE
         OH    R8,DCB.DN(RD)            OR THE DEVICE ADDR INTO LOW BITS
         STH   R8,DCB.STAT(RD)
         B     TERMERR3                 AND GOTO...
*
INITERR6 EQU   *
*    PIPE SYSTEM LINKAGE FAILURE, SYSGEN ERROR
         LHI   R8,X'A100'               STATUS = DEVICE UNAVAILABLE (APPROX)
         STH   R8,DCB.STAT(RD)
         B     TERMERR3                 AND GOTO...
*
*
```

```
*
************************************
*
*
          TITLE PIPEREAD  ESR INITIALIZATION TO START READ TRANSFER
          ALIGN 4
************************************
* * *     ESR PIPEREAD, ESR INITIALIZATION TO START READ TRANSFER
* * *     ENTRY SPECIFICATIONS:
* * *          UD = A(DCB)
* * *          UF = A(LEAF)
* * *     EXIT SPECIFICATIONS:
* * *          EXIT TO IODONE2 OR DIRDONE
************************************
*
PIPEREAD EQU   *
         LH    R8,DCB.TOUT(RD)      CHECK FOR TIME OUT
         BZ    TERMITE              PURGE BY WRITER IF WE HAVE
*   INITIALIZE SOME REGISTERS
         L     R7,DCB.CPIP(RD)      A(COMPLIMENTARY DCB)
*   FORCE ALL HARDWARE INTO IDLE CONDITION.
         LA    R8,III               FIND IGNORE INTERUPT IMMEDIATE
         LHL   RA,DCB.SDN(RD)       FIND THE SELCH ADDRESS
         STH   R8,ISPTAB(RA,RA)     ISP TABLE GETS IGNORE
         OC    RA,SELCHSTP          STOP THE SELCH
         BTC   4,INITERR2           ERROR IF SELCH GIVES FALSE SYNC
         LHL   RA,DCB.DN(RD)        FIND THE DEVICE ADDRESS
         STH   R8,ISPTAB(RA,RA)     ISP TABLE GETS IGNORE
         OC    RA,SELCHSTP          ADDRESS THE DEVICE
         BTC   4,INITERR5           ERROR IF DEVICE GIVES FALSE SYNC
         LHI   R8,TOCPAIR           SET UP TIME OUT CONSTANT
         STH   R8,DCB.TOUT(RD)
*   IS THE OTHER END OF THE PIPE HOLD ?
         L     R8,DCB.PEST(R7)      COMPLIMENTARY STATE
         CHI   R8,2                 HOLD STATE IS 2
         BE    RWACTIVE             = HOLD ? THEN GO TO ...
*   READ REQUEST RECEIVED, NO COMPLIMENTARY REQUEST IN HOLD STATE
*   REMAIN IN HOLD STATE AND EXIT DRIVER
         LIS   R8,2                 SET STATE = HOLD
         ST    R8,DCB.PEST(RD)
         LA    RE,RWACTIVE          PREPARE FOR SYNC AND ACTIVATION
         BAL   R8,EVMOD             DO IT WITH EVMOD FOR COMPATEBILITY
*                                   R9 DESTROYED !
         B     EVRTE                AND EXIT DEVICE START UP
*
*
************************************
* * *     ESR RACTIVE, READ/WRITE ACTIVE
* * *     ENTRY SPECIFICATIONS:
* * *          UD = A(DCB)
* * *          UF = A(LEAF)
* * *     EXIT SPECIFICATIONS:
* * *          EXIT TO DIRDONE OR INITERR_ OR CMDERR_
************************************
*
RWACTIVE EQU   *                    ACTIVE STATE
*   SYNC ACHEIVED
*   COMPLIMENTARY READ WRITE I/O REQUESTS ASSUMED AT THIS POINT
         LH    R8,DCB.TOUT(RD)      CHECK FOR TIME OUT
         BZ    TERMERR2             ERROR TERMINATION IF WE HAVE
*   SET UP TIME OUT, SET UP SELCH AND GO
         L     R7,DCB.CPIP(RD)      A(COMPLIMENTARY DCB)
         LIS   R8,3                 SET STATE = ACTIVE
         ST    R8,DCB.PEST(RD)
         ST    R8,DCB.PEST(R7)
         LHI   R8,TOCPIPE           SET UP TIME OUT CONSTANT
```

```
          STH     R8,DCB.TOUT(RD)
          STH     R8,DCB.TOUT(R7)
          LA      RE,TERMRPIP            PREPARE FOR TERMINATION
          BAL     R8,EVMOD               DO IT WITH EVMOD FOR COMPATEBILITY
*                                        R9 DESTROYED !
*         DETERMINE THE MINIMUM TRANSFER LENGTH OF BOTH PIPE END'S REQUESTS
          L       R8,DCB.RTL(RD)         THIS ENDS REQUESTED TRANFER LENGTH
          C       R8,DCB.RTL(R7)         COMPLIMENTARY END'S LENGTH
          BNP     RMIN                   BRANCH IF THIS END'S LESS
          L       R8,DCB.RTL(R7)         OTHER END IS LESS
RMIN      EQU     *
          LR      R9,R8                  TEMPERARY MINIMUM TRANSFER LENGTH
          AIS     R9,1                   PRE-CALCULATE EXPECTED TRANSFER LENGTH
          ST      R9,DCB.LLXP(RD)
          LR      R9,R8                  REPAIR LENGTH FOR SELCH
          A       R9,DCB.SADR(RD)        ADD STARTING ADDRESS TO LENGTH
          ST      R9,DCB.EADR(RD)        MODFIY ENDING ADDRESS
          LR      R9,R8                  REPAIR LENGTH FOR SELCH
          A       R9,DCB.SADR(R7)        ADD STARTING ADDRESS TO LENGTH
          ST      R9,DCB.EADR(R7)        MODFIY ENDING ADDRESS
*
*         SOFTWARE DATA MOVE ROUTINE (NORMALLY BRANCHED AROUND)
*         NO-OP BRANCH TO PERFORM SOFTWARE MOVES (BYPASS HARDWARE)
          B       NORMAL
          LIS     R2,0                   STARTING INDEX VALUE
          LIS     R3,2                   INDEX INCREMENT
          LR      R4,R8                  FINAL VALUE
          SIS     R4,1                   FOR 'LESS THAN OR EQUAL TO'
          L       R9,DCB.SADR(R7)        WRITER'S START ADDRESS
          L       R8,DCB.SADR(RD)        READER'S START ADDRESS
MOVER     EQU     *
          LH      R5,0(R9,R2)            LOAD  HALF WORD FROM WRITER
          STH     R5,0(R8,R2)            STORE HALF WORD INTO READER
          BXLE    R2,MOVER               LOOP FOR MORE DATA
          L       R5,DCB.LEAF(R7)        SCHEDULE WRITER TERMINATION
          ATL     R5,SQ
          L       R5,DCB.LEAF(RD)        SCHEDULE READER TERMINATION
          ATL     R5,SQ
          B       EVRTE                  AND EXIT SOFTWARE DATA MOVE
NORMAL    EQU     *
*
          LHL     R2,DCB.SDN(R7)         SELCH ADDRESS
          LA      R3,III                 SETUP ISP TABLE
          LHL     R4,DCB.CCB(R7)         USING THE CCB
          STH     R3,CCB.SUBA(R4)        FOR SELCH
          LA      R3,1(R4)
          STH     R3,ISPTAB(R2,R2)       AT THE SELCH ISP TABLE SLOT
          LHL     R2,DCB.SDN(RD)         SELCH ADDRESS
          LA      R3,RWACTISR            SETUP ISP TABLE
          LHL     R4,DCB.CCB(RD)         USING THE CCB
          STH     R3,CCB.SUBA(R4)        FOR SELCH SIMULATE INTERUPT
          LA      R3,1(R4)
          STH     R3,ISPTAB(R2,R2)       AT THE SELCH ISP TABLE SLOT
          LH      R8,DCB.ILVL(RD)        USING I/O PRIORITY LEVEL
          SINT    R8,0(R2)               FIRE UP THE FIRST ISR
          B       EVRTE                  AND EXIT THIS ESR
*
*
*********************************
          IMPUR
          TITLE TERMINATION ESR FOR VARIOUS CONDITIONS
          ALIGN 4
*********************************
* * *     ESR TERMRPIP, TERMINATION ROUTINE
* * *     (DEFAULT TERMINATION ESR)
* * *     ENTRY SPECIFICATIONS:
```

```
* * *            UD  = A(DCB)
* * *            UF  = A(LEAF)
* * *     EXIT SPECIFICATIONS:
* * *            EXIT TO IODONE OR TERMERR2
****************************************
*
TERMRPIP EQU   *
         LH    R6,DCB.TOUT(RD)    CHECK FOR TIME OUT
         BZ    TERMERR2           ERROR TERMINATION IF WE HAVE
*   TERMINATE THIS I/O REQUEST AND EXIT.
         SR    R8,R8              STATUS = NO ERROR
         STH   R8,DCB.STAT(RD)
         LIS   R8,1
         ST    R8,DCB.PEST(RD)    STATE = READY
TERMITE  EQU   *                  ENTRY FOR PURGE TERMINATION
         LA    R8,SQS.SLV         SINGLE LEVEL SQS CONNECT
         ST    R8,EVN.SQS(RF)     INTO READER'S LEAF
         BAL   R8,TOCHOFF         OFF THE TIME OUT CHAIN
*                                 RA, RB DESTROYED !
         B     IODONE
*
*
****************************************
* * *     ESR TERMERR2, ERROR TERMINATION (TIME OUT OCCURED).
* * *     ENTRY SPECIFICATIONS:
* * *            UD  = A(DCB)
* * *            UF  = A(LEAF)
* * *     EXIT SPECIFICATIONS:
* * *            EXIT TO IODONE
****************************************
*
TERMERR2 EQU   *
*   ESR TERMERR2, ERROR TERMINATION ROUTINE (TIME OUT OCCURED).
*   TERMINATE THIS I/O REQUEST AND EXIT.
*   FORCE ALL HARDWARE INTO IDLE CONDITION.
         LA    R8,III             FIND IGNORE INTERUPT IMMEDIATE
         LHL   RA,DCB.SDN(RD)     FIND THE SELCH ADDRESS
         STH   R8,ISPTAB(RA,RA)   ISP TABLE GETS IGNORE
         OC    RA,SELCHSTP        STOP THE SELCH
         LHI   R8,X'8200'         STATUS = UNRECOVERABLE, TIME OUT
         OH    R8,DCB.SDN(RD)     OR THE SELCH ADDR INTO LOW BITS
         STH   R8,DCB.STAT(RD)
         LIS   R8,0
         ST    R8,DCB.LLXF(RD)    ZERO TRANSFER LENGTH
         LCS   R8,1               -1
         ST    R8,DCB.PEST(RD)    STATE = ERROR
         LA    R8,SQS.SLV         SINGLE LEVEL SQS CONNECT
         ST    R8,EVN.SQS(RF)     INTO READER'S LEAF
         BAL   R8,TOCHOFF         OFF THE TIME OUT CHAIN
*                                 RA, RB DESTROYED !
         B     IODONE
*
****************************************
* * *     ESR TERMERR3, ERROR TERMINATION (ISR DETECTED ERROR).
* * *     ENTRY SPECIFICATIONS:
* * *            UD  = A(DCB)
* * *            UF  = A(LEAF)
* * *     EXIT SPECIFICATIONS:
* * *            EXIT TO IODONE
****************************************
*
TERMERR3 EQU   *
*   ESR TERMERR3, ERROR TERMINATION ROUTINE (ISR DETECTED ERROR).
*   TERMINATE THIS I/O REQUEST AND EXIT.
         LIS   R8,0
         ST    R8,DCB.LLXF(RD)    ZERO TRANSFER LENGTH
```

```
         LCS    R8,1                   -1
         ST     R8,DCB.PEST(RD)        STATE = ERROR
         LA     R8,SQS.SLV             SINGLE LEVEL SQS CONNECT
         ST     R8,EVN.SQS(RF)         INTO READER'S LEAF
         BAL    R8,TOCHOFF             OFF THE TIME OUT CHAIN
*                                      RA, RB DESTROYED !
*   NOTE: OUR TERMINATION STATUS IS PROVIDED BY TERMERR3 SCHEDULER
         B      IODONE
*
****************************************
         PURE
         TITLE READ ACTIVE, ISR TO SET UP AND START THE SELCH
         ALIGN 4
****************************************
* * *    READ/WRITE ACTIVE, ISR TO SET UP AND START THE SELCH
* * *    ENTRY SPECIFICATIONS:
* * *            E0 = OLD PSW
* * *            E1 = OLD LOC
* * *            E2 = SELCH ADDRESS
* * *            E3 = DEVICE STATUS
* * *            E4 = A(CCB)
* * *    EXIT SPECIFICATIONS:
* * *            EXIT LPSWR E0
****************************************
*
RWACTISR EQU    *
*   READ/WRITE ACTIVE, ISR TO SET UP AND START THE SELCH
         L      E5,CCB.DCB(E4)         A(DCB)
         LA     E3,INTERUPT            SETUP ISP TABLE
         STH    E3,CCB.SUBA(E4)        FOR SELCH INTERUPT
         OC     E2,SELCHSTP            STOP
         L      E3,DCB.SADR(E5)        GET THE USER'S DMA START ADDRESS
         EXHR   E3,E3                  STARTING ADDRESS TO SELCH
         WDR    E2,E3
         EXHR   E3,E3
         WHR    E2,E3
         L      E3,DCB.EADR(E5)        GET THE USER'S DMA END   ADDRESS
         EXHR   E3,E3                  ENDING ADDRESS TO SELCH
         WDR    E2,E3
         EXHR   E3,E3
         WHR    E2,E3
         LHL    E6,DCB.DN(E5)          DEVICE ADDRESS
         OCR    E6,E3                  SET DEVICE ADDRESS FLIP/FLOP
         OC     E2,SELCHRD             START SELCH READING
*   READ/WRITE ACTIVE, ISR TO SET UP AND START THE SELCH
         L      E5,DCB.CPIP(E5)        FIND THE COMPLIMENTARY DCB
         LHL    E4,DCB.CCB(E5)         FIND THE COMPLIMENTARY CCB
         LHL    E2,DCB.SDN(E5)         FIND THE COMPLIMENTARY SELCH
         LA     E3,INTERUPT            SETUP ISP TABLE
         STH    E3,CCB.SUBA(E4)        FOR SELCH INTERUPT
         OC     E2,SELCHSTP            STOP
         L      E3,DCB.SADR(E5)        GET THE USER'S DMA START ADDRESS
         EXHR   E3,E3                  STARTING ADDRESS TO SELCH
         WDR    E2,E3
         EXHR   E3,E3
         WHR    E2,E3
         L      E3,DCB.EADR(E5)        GET THE USER'S DMA END   ADDRESS
         EXHR   E3,E3                  ENDING ADDRESS TO SELCH
         WDR    E2,E3
         EXHR   E3,E3
         WHR    E2,E3
         LHL    E6,DCB.DN(E5)          DEVICE ADDRESS
         OCR    E6,E3                  SET DEVICE ADDRESS FLIP/FLOP
         OC     E2,SELCHWR             START SELCH READING
         LPSWR  E0                     AND EXIT THIS ISR
*
*
```

```
              TITLE ISR FOR ACTUAL INTERUPTS COMING FROM SELCHES
              ALIGN 4
***************************************
* * *     SECOND ISR, INTERUPT UPON COMPLETION OF DMA.
* * *        ENTRY SPECIFICATIONS:
* * *               E0  = OLD PSW
* * *               E1  = OLD LOC
* * *               E2  = SELCH ADDRESS
* * *               E3  = DEVICE STATUS
* * *               E4  = A(CCB)
* * *        EXIT  SPECIFICATIONS:
* * *               EXIT LPSWR E0
***************************************
*
INTERUPT EQU    *
*   ISR, SELCH INTERUPT UPON DMA TERMINATION RECEIVED
            OC    E2,SELCHSTP         STOP THE SELCH !
            LA    E7,III              RESET ISP TABLE TO IGNORE
            STH   E7,ISPTAB(E2,E2)
            L     E5,CCB.DCB(E4)      A(DCB)
            L     E6,DCB.CPIP(E5)     A(COMPLIMENTARY DCB)
            LH    E7,DCB.TOUT(E5)     HAVE WE TIMED OUT ? TERMINATING ?
            BNP   ISRTIMEO              DISAPPEAR LIKE MAGIC IF WE ARE !
            LCS   E7,1                -1
            STH   E7,DCB.TOUT(E5)     TIME OUT = -1, 'NORMAL' TERMINATION
            RD    E2,DCB.RTL+1(E5)    READ SELCH ENDING ADDRESS
            RH    E2,DCB.RTL+2(E5)
            L     E7,DCB.RTL(E5)
            C     E7,DCB.EADR(E5)      COMPARE TO REQUESTED ENDING ADDRESS
            BNE   ISRERR2              ERROR IF NOT EQUAL
            THI   E3,X'30'             GOOD SELCH STATUS ?
            BNZ   ISRERR2              COMPLAIN IF NOT
            LIS   E7,4                SET STATE = INTERUPT RECEIVED
            ST    E7,DCB.PEST(E5)
            L     E7,DCB.LEAF(E5)      SCHEDULE TERMINATION ESR
            ATL   E7,SQ
DISAPPR  EQU    *
            LPSWR E0                  AND EXIT
*
*
***************************************
* * *    ISRERR2, BAD SELCH STATUS, PIPE STATUS, ENDING ADDRESS ETC.
* * *       ENTRY SPECIFICATIONS:
* * *               E0  = OLD PSW
* * *               E1  = OLD LOC
* * *               E5  = A(DCB)
* * *               E6  = A(COMPLIMENTARY DCB)
* * *       EXIT  SPECIFICATIONS:
* * *               EXIT ISRSCHED
***************************************
*
ISRERR2  EQU    *
*   ISR ISRERR2, BAD SELCH STATUS, PIPE STATUS, ENDING ADDRESS ETC.
            LHI   E7,X'8300'          STATUS = RECOVERABLE ERROR
            OH    E7,DCB.SDN(E5)      OR THE SELCH ADDR INTO LOW BITS
            B     ISRSCHED            GO SCHEDULE TERMINATION
*
***************************************
* * *    ISRSCHED, SCHEDULE TERMITION FOR ISR DETECTED ERRORS.
* * *       ENTRY SPECIFICATIONS:
* * *               E0  = OLD PSW
* * *               E1  = OLD LOC
* * *               E5  = A(DCB)
* * *               E6  = A(COMPLIMENTARY DCB)
* * *               E7  = ERROR STATUS HALFWORD
```

```
* * *     EXIT SPECIFICATIONS:
* * *           EXIT LPSWR E0
*************************************
*
ISRSCHED EQU   *
*   ISR ISRSCHED, SCHEDULE TERMINAION FOR ISR DETECTED ERRORS.
         STH   E7,DCB.STAT(E5)    DCB.STAT = STATUS PROVIDED IN E7
         L     E4,DCB.LEAF(E5)    GIVE THE LEAF TO SYSTEM QUEUE
         ATL   E4,SQ
         LA    E3,TERMERR3        SCHEDULE ERROR TERMINATION
         OI    E3,Y'80000000'     DON'T LET DIRDONE CHANGE IT !
         ST    E3,DCB.ESR(E5)
         LIS   E7,6               SET STATE = ERROR PROCESSING
         ST    E7,DCB.PEST(E5)
         LPSWR E0
*
*************************************
* * *     ISRTIMEO, ISR TO PROCESS TIME OUTS DETECTED DURING AN ISR.
* * *     ENTRY SPECIFICATIONS:
* * *           E0 = OLD PSW
* * *           E1 = OLD LOC
* * *     EXIT SPECIFICATIONS:
* * *           EXIT LPSWR E0
*************************************
*
ISRTIMEO EQU   *
*   ISR ISRTIMEO, TIME OUT ISR ERROR HANDLER
         LPSWR E0                        EXIT IMMEDIATELY
*
*
*************************************
*
*
         END
         BEND
         BATCH
*************************************
         TITLE DCB198 DCB FOR WRITE  DATA PIPE SELCH
*************************************
*   THIS IS THE DCB USED BY WRITE  DATA PIPE SELCHES.
         LIST
         MLIBS 8,9,10
         EXTRN COMFIFO
         DPROG DCOD=198
*
PIPEDCB  STRUC                     DCB DEVICE DEPENDENT STRUCTURE
         DS    DCB.PCB
         ALIGN 4
DCB.PEST DS    4                   PIPE END STATE (-1 TO +6)
*                                  -1=ERROR; SYNCHRONIZATION REQUIRED
*                                   0=SYNC; SYNC REQUEST RECEIVED
*                                   1=READY; IDLE OR UNMATED REQUEST
*                                   2=READY-HOLD; MATE CONNECTION
*                                   3=READY-ACTIVE; DMA STARTED
*                                   4=READY-INTERUPT; INTERUPT RECEIVED
*                                   5=READY-TERMINATE; GOOD CLEANUP
*                                   6=READY-ERROR; ERROR CLEANUP
DCB.CPIP DS    4                   A(COMPLIMENTARY END DCB)
DCB.RTL  DS    4                   REQUESTED TRANSFER LENGTH
         ENDS
*
         DCB   DCOD=198,INIT=INITWPIP,TERM=TERMWPIP,FUNC=CMDWPIP,     1
               IOH=COMIOH,QSR=COMFIFO,EDMA=0,ATRB=3BC8,RECL=0,        2
               SIZE=PIPEDCB,FLGS=DFLG.LNM
*
*   DCB198 DEVICE DEPENDENT SECTIO
*
```

```
        ORG     DCB198+DCB.CCB
        DC      Z(CCB198)
        EXTRN   Z(CDN2)
        ORG     DCB198+DCB.SDN
        DC      Z(CDN2)
        ORG     DCB198+DCB.PEST
        DAC     -1
        ORG     DCB198+DCB.CPIP
        DAC     0
*
        PURE
*
*   CCB198 REQUIRED TO PROVIDE DCB ADDRESS UPON INTERUPTS
*
CCB198  EQU     *                       CCB USED FOR PIPE INTERUPTS
        DO      CCB.DCB+1+3/4
        DAC     0
        ORG     CCB198+CCB.DCB
        DAC     DCB198
*
        END
        TITLE  WRITE   DATA PIPE DRIVER OVERVIEW AND DOCUMENTATION
INITWPIP PROG   WRITE   DATA PIPE DRIVER, BACK-TO-BACK B-SELCHES
* * * * * * REMINDER LIST * * * * * * * * * * * * * * * * * * *
*
*
* * * * * * ODDITIES LIST * * * * * * * * * * * * * * * * * * *
*
* A RATHER UNSUAL OPERATIONAL REQUIREMENT OF THE CURRENT
* BACK-TO-BACK B-SELCHES IS THAT
* 1) UNIDIRECTIONAL, SELCH-R CAN ONLY READ, SELCH-W CAN ONLY WRITE,
* 2) START SEQUENCE = ADDRESS READ DEVICE, GO SELCH-R,
*    ADDRESS WRITE DEVICE, GO SELCH-W
* 3) SELCH-W LENGTH MUST BE LESS THAN OR EQUAL TO SELCH-R LENGTH,
* THE DEVICE SHOULD NOT BE REFERENCED WITH A SENSE STATUS TO SET THE
* ADDRESS FLIP / FLOP, AN OUTPUT COMMAND IS RECOMMENDED.
*
* THE RESOURCE CONNECTION STRATEGY (LEAF AND NODE CONNECTION TREE)
* HAS A STRANGE TWIST IN IT WHICH ALLOWS THE PROPER QUEUEING OR
* SCHEDULING OF REQUESTS WHILE REQUIRING ONLY ONE LEAF QUEUE.
* INITIALLY THE EVN.SQS OF A PIPE'S LEAF SPECIFIES SINGLE LEVEL LEAF
* CONNECTION AND THE CORRESPONDING DCB.ESR SPECIFIES A PIPE
* MANAGER (INITRPIP AND CMDRPIP) DRIVER ENTRY.
* THE PIPE MANAGER FOR A SINGLE LOGICAL PIPE END MAY THUS BE ENTERED
* WITHOUT FULL CONNECTION TO THE HARDWARE PIPE SELCH.
* WHEN THE PIPE MANAGER DETERMINES THAT AN ACTUAL DATA TRANSFER
* IS REQUIRED, EVN.SQS IS CHANGED TO INDICATE MULTIPLE LEVEL CONNECTION,
* THE DCB.ESR IS CHANGED TO INDICATE THE DATA PIPE DRIVER'S
* INITIALIZE TRANSFER ENTRY (PIPEREAD OR PIPEWRIT) AND
* THE NON HALTABLE BIT IN DCB.RFLG IS SET (TO PREVENT THE BREAKAGE
* OF A LOGICAL REQUEST PAIR ON SEPERATE CONNECT PATHS).
* AFTER THIS MODIFICATION IS MADE TO THE COMPLIMENTARY PIPE ENDS
* THEIR RESPECTIVE LEAF IS
* ADDED TO THE SYSTEM QUEUE FOR EVENT SERVICE SCHEDULING.
* WHEN THE HARDWARE DATA PIPE SELCHES BECOME AVAILABLE (THEY ARE
* SHARED BY ALL LOGICAL PIPES SYSGENED UNDER THEM) FULL CONNECTION
* IS ACHIEVED AND THE TRANSFER SEQUENCE IS INITIALIZED.
* AFTER THE DATA TRANSFER HAS COMPLETED, THE DRIVER TERMINATION
* ROUTINE CHANGES EVN.SQS TO IT'S SINGLE LEVEL VALUE.
*
*
* * * * * * COMMENT LIST * * * * * * * * * * * * * * * * * * *
*
*
* A MIS-MATCH BETWEEN READ AND WRITE TRANSFER LENGTH IS ALLOWED.
* THE MINIMUM OF THE TWO BEING ACTUALLY TRANSFERED.
* THE READER'S RETURNED TRANSFER LENGTH IS THE
```

```
* ACTUAL TRANSFER LENGTH AND THE WRITER'S RETURNED TRANSFER LENGTH
* IS THE FULL AMOUNT HE REQUESTED TO BE WRITTEN.
* THIS WOULD CORRESPOND TO WRITING A LONG TAPE RECORD AND
* NOT BEING AWARE OF THE LENGTH ACTUALLY READ AND
* LIKEWISE REQUESTING AN EXTRA LONG READ AND SUBSEQUENTLY CHECKING
* THE  ACTUAL LENGTH OF TRANSFER.
*
* THE NUMBER OF RECORDS READ MAY BE FEWER THAN THE NUMBER OF RECORDS
* WRITTEN WITHOUT CREATING AN ERROR CONDITION.
* THIS WOULD CORRESPOND TO A READER NOT TRAVERSING THE ENTIRE
* INPUT TAPE IF NOT REQUIRED FOR THE READER'S PROCESSING AND
* THE WRITER OF THE TAPE NOT BEING AWARE OF IT.
* ATTEMPTING TO READ MORE RECORDS THAN ARE WRITTEN PRESENTS
* AN ERROR TO THE READER REQUIREING SYNCHRONIZATION TO RECOVER.
*
* THE I/O PROCEED, I/O WAIT, TEST I/O COMPLETE, WAIT I/O COMPLETE,
* UNCONDITIONAL PROCEED, ARE VALID TO ANY PIPE END AND HAVE THEIR
* USUAL INTERPRETATION.
* THE READ PIPE END ONLY ACCEPTS 'READ', 'FSR' (FORWARD-SPACE-RECORD),
* 'FSF' (FORWARD-SPACE-FILE), 'RW' (REWIND) AND 'UN' (UNLOAD)
* FUNCTION CODES.
* ALL OTHERS ARE EITHER REJECTED IMMEDIATELY WITH 'CO' ILLEGAL
* FUNCTION STATUS OR ARE NO-OPERATION (FOLLOWING STANDARD IOH RULES).
* THE WRITE PIPE END ONLY ACCEPTS 'WRITE', 'WFM' (WRITE-FILE-MARK),
* 'RW' (REWIND) AND 'UN' (UNLOAD) FUNCTION CODES.
* ALL OTHERS ARE EITHER REJECTED IMMEDIATELY WITH 'CO' ILLEGAL
* FUNCTION STATUS OR ARE NO-OPERATION (FOLLOWING STANDARD IOH RULES).
* ALL REQUESTS WAITING IN A QUEUE FOR SERVICE ARE SUBJECT TO REMOVAL
* VIA HALT I/O REQUESTS, SUCH AS THOSE GENERATED BY THE TASK CANCEL
* PROCESSOR.
*
* VALID 'RECORD EXCHANGE' REQUESTS FOR THE WRITER'S END
* ARE 'WRITE' AND 'WF' (WRITE-FILE-MARK).
* VALID 'RECORD EXCHANGE' REQUESTS FOR THE READER'S END
* ARE 'READ', 'FSR' (FORWARD-SPACE-RECORD) AND
* 'FSF' (FORWARD-SPACE-FILE).
* VALID 'STATE CHANGE' REQUESTS FOR THE READER AND
* WRITER ENDS ARE 'RW' (REWIND) TO ENTER THE SYNC STATE WHICH
* EFFECTIVELY REQUESTS A NEW SYNCHRONIZATION AND
* 'UN' (UNLOAD) TO ENTER THE ERROR STATE WHICH EFFECTIVELY
* TERMINATES A LOGICAL STREAM OF DATA.
*
* ALL REQUESTS ARE SERVICED IN STRICT FIFO ORDER.
* EXPLICIT 'STATE CHANGE' REQUESTS  ARE SERVICED IMMEDIATELY UPON
* REACHING THE TOP OF THEIR QUEUE AND ARE NEVER HELD THERE.
* LOGICAL RECORD EXCHANGE REQUESTS TO A PIPE END CURRENTLY IN AN
* ERROR STATE ARE ALSO SERVICED IMMEDIATELY.
* LOGICAL RECORD EXCHANGE REQUESTS TO A PIPE END CURRENTLY IN A SYNC
* STATE ARE HELD AS THE TOP QUEUE ITEM UNTIL THE COMPLIMENTARY PIPE
* END ENTERS THE SYNC STATE AND HAS A LOGICAL RECORD EXCHANGE REQUEST
* AT THE TOP OF IT'S QUEUE TO PROCESS.
*
* IF YOU BELIEVE A PICTURE IS WORTH A THOUSAND WORDS,
* THE FOLLOWING TRANSITION TABLE SHOULD PROVE A COUNTER EXAMPLE.
* HOWEVER, WITH SOME STUDY IT DOES EFFECTIVELY DESCRIBE THE
* THE VARIOUS WRITER AND READER STATES AND INTERACTIONS.
* THE 'SYNC SYNC OR QUEUE' IS A SPECIAL CASE WHERE IF BOTH ENDS
* ARE IN SYNC STATE AND HAVE A 'RECORD EXCHANGE' REQUEST AT THE TOP
* OF THEIR RESPECTIVE QUEUES, THEN BOTH PIPE ENDS GO TO READY STATE
* AND FURTHER PROCESSING CONTINUES.
* OTHERWISE 'SYNC SYNC OR QUEUE' SIMPLY KEEPS THE REQUEST ON THE
* TOP OF THE CORRESPONDING QUEUE.
* THE LEFT SIDE ROW HEADINGS HAVE BEEN ABBREVIATED DUE TO SPACE
* LIMITATIONS, HOWEVER THEY PARELLEL THE TOP HEADINGS WITH READ AND
* WRITE REVERSED.
*
      EJECT
```

```
                                            TYPE OF WRITER REQUEST
                                            WHICH IS BEING PROCESSED
                                            ------------------------------
                                            WRITER  WRITER  WRITER  WRITER
                                            WRITE   REWIND  WFM     UNLOAD

STATES ENCOUNTERED WHILE PROCESSING THE TOP OF READER QUEUE
        ----------------------------------------------------------------
        READER  WRITER              WRITER QUEUE NON-EMPTY
        IN      QUEUE   ----------------------------------------------------
        ERROR   EMPTY   READER              READER IN READY STATE
        STATE           IN      ----------------------------------------------
                        SYNC    WRITER  WRITER  WRITER IN READY STATE
                        STATE   IN      IN      ------------------------------
                                ERROR   SYNC    WRITER  WRITER  WRITER  WRITER
                                STATE   STATE   WRITE   REWIND  WFM     UNLOAD

*------------------------------------------------*****************************
*WRITER                                          *WRITE   REWIND  WFM     UNLOAD*
*IN                                              * 84,E    00,S   84,E    84,E *
*ERROR      RESPONSE DEFINITION                  *                              *
*STATE      E    = GO TO ERROR STATE             *                              *
*-------    S    = GO TO SYNC STATE              *------------------------------*
*READER     R    = GO TO READY STATE             *QUEUE   REWIND  QUEUE   UNLOAD*
*QUEUE      QUEUE= HOLD AT TOP OF QUEUE          *WRITE    00,S   WFM      00,E *
*EMPTY      BLANK= NO CHANGE                     *                              *
*           88   = END OF FILE STATUS            *                              *
*-------    84   = UNRECOVERABLE ERROR STAT*-----------------------------------*
*WRITER     00   = GOOD (NO ERROR) STATUS        * SYNC   REWIND  SYNC    UNLOAD*
*IN         DATA-X= DATA PIPE TRANSFER           * SYNC    00,S   SYNC     00,E *
*SYNC                                            * OR             OR            *
*STATE              EXAMPLE                      *QUEUE           QUEUE         *
*-------            -------                      *------------------------------*
*READER         WRITE RESPONSE       WFM         *WRITE   REWIND  WFM     UNLOAD*
*IN                                  00,R        * 00,R    00,S   00,R    00,E *
*ERROR          READ  RESPONSE       READ        *                              *
*STATE                               88,R        *                              *
*-------                             -------     *------------------------------*
*READER                                          *WRITE   REWIND  WFM     UNLOAD*
*IN                                              * 00,R    00,S   00,R    00,E *
*SYNC                                            *                              *
*STATE                                           *                              *
*-------******************************************------------------------------*
*        *                   SYNC                *WRITE   REWIND  WFM     UNLOAD*
*        *                   SYNC                *DATA-X   00,S   00,R    00,E *
*READER* READ   QUEUE        OR      READ   READ  READ    READ    READ    READ *
*READ  * 84,E   READ         QUEUE   84,E   84,E  DATA-X  84,E    88,R    84,E *
*-------*-----------------------------------------------------------------------*
*        *                                       *WRITE   REWIND  WFM     UNLOAD*
*        *                                       * 00,R    00,S   00,R    00,E *
*READER*REWIND REWIND REWIND REWIND REWIND REWIND REWIND  REWIND  REWIND  REWIND*
*REWIND* 00,S   00,S   00,S   00,S   00,S   00,S  00,S    00,S    00,S    00,S *
*-------*-----------------------------------------------------------------------*
*        *                   SYNC                *WRITE   REWIND  WFM     UNLOAD*
*        *                   SYNC                * 00,R    00,S   00,R    00,E *
*READER*  PSR    QUEUE        OR     PSR    PSR   PSR     PSR     PSR     PSR  *
*PSR   *  84,E   PSR          QUEUE  84,E   84,E  00,R    84,E    88,R    84,E *
*-------*-----------------------------------------------------------------------*
*        *                   SYNC                *WRITE   REWIND  WFM     UNLOAD*
*        *                   SYNC                * 00,R    00,S   00,R    00,E *
*READER*  PSF    QUEUE        OR     PSF    PSF   PSF     PSF     PSF     PSF  *
*PSF   *  84,E   PSF          QUEUE  84,E   84,E  QUEUE   84,E    88,R    84,E *
*-------*-----------------------------------------------------------------------*
```

```
*         *                                   WRITE  REWIND   WFM    UNLOAD*
*         *                                   00,R   00,S    00,R    00,E  *
*READER*UNLOAD QUEUE  UNLOAD UNLOAD UNLOAD UNLOAD UNLOAD UNLOAD UNLOAD*
*UNLOAD* 00,E  UNLOAD  00,E   00,E    00,E    00,E   00,E    00,E    00,E  *
*------*******************************************************************
*
        EJECT
*
* * * * * * GENERAL DESCRIPTION * * * * * * * * * * * * * * *
*
*
*
* PRIMARILY THE PIPE MANAGER SHOULD ACCEPT SIMPLE SEQUENTIAL
* DATA TRANSFER REQUESTS AND REJECT OTHER FUNCTIONS AND COMMANDS.
* HOWEVER IT MAY BE APPROPRIATE TO HONOR A FEW SELECTED COMMAND
* AND FUNCTION SEQUENCES TO MORE CLOSELY MIMICK THE BEHAVIOR
* OF A MAGNETIC TAPE EXCHANGE.
* FOR EXAMPLE, IT WOULD SEEM REASONABLE FOR A TAPE USER TO ISSUE
* A REWIND REQUEST PRIOR TO ANY DATA TRANSFERS TO ENSURE CORRECT TAPE
* POSITIONING.
* THIS CONCEPT IS EMPLOYED HERE TO ENSURE SYNCHRONIZATION BETWEEN
* SUCCESIVE USERS AND TO PREVENT THE INADVERTENT MIXING OF DATA STREAMS.
* EACH NEW USER OF A PIPE END OR LOGICALLY DISTINCT DATA STREAM PASSED
* THROUGH A PIPE BETWEEN TWO ESTABLISHED USERS SHOULD BE PRECEEDED
* BY A REWIND COMMAND.
* A REWIND COMMAND IS IN EFFECT A REQUEST FOR SYNCHRONIZATION BY
* THE USER OF A PIPE END AND PREVENTS ANY FURTHER DATA EXCHANGE UNTIL
* A REWIND COMMAND IS ISSUED AT THE COMPLIMENTARY PIPE END.
* ONCE SYNCHRONIZATION IS ACHEIVED BY THE USERS OF COMPLIMENTARY PIPE
* ENDS, THE OPERATING SYSTEM PIPE DRIVER HONORS SUCCESIVE SVC1
* FUNCTION AND COMMAND REQUESTS UNTIL AN ERROR OCCURS WHICH REQUIRES
* THE PIPE TO BE SYNCHRONIZED AGAIN.
* SUCH ERRORS MAY BE INTENTIONAL, AS IS THE UNLOAD COMMAND, AND SIGNAL
* THE END OF A LOGICAL STREAM OF DATA.
* OTHER ERRORS MAY BE INADVERTENT, SUCH AS A READER'S READ BEING PAIRED
* WITH A WRITER'S REWIND
*
*
*
*
*       SVC 1 STATUS ERROR CODE DESCRIPTION ( XX = SELCH/PIPE ADDR )
*   '9999'    YOU GOT THE BOOBY PRIZE, A SITUATION HAS ARISEN WHICH
*             WAS NOT THOUGHT POSSIBLE.  PRESENT AND VALIDATE THIS
*             ERROR TO RANDY SELZLER AND COLLECT YOUR FREE BEER.
*   'A0XX'    SELCH GIVES FALSE SYNC ERROR, DEVICE UNAVAILABLE
*   'A100'    PIPE SYSTEM LINKAGE FAILURE, SYSGEN ERROR !
*   '82XX'    DEVICE TIMEOUT DURING TRANSFER, HARDWARE FAILURE
*   '83XX'    BAD SELCH STATUS AFTER TRANSFER TERMINATION
*   '8483'    USER'S ADDRESS ALIGNMENT OR LENGTH ERROR
*   '8484'    UNRECOVERABLE, CONFLICTING SEQUENCE OF USER'S REQUESTS
*
* *** CUP CONFIGURATION ***
*      ALL DEVICE STATEMENTS REFRENCING THE SAME PHYSICAL PIPE
*   HARDWARE (PAIR OF BACK-TO-BACK B-SELCHES) SHOULD SPECIFY THE
*   SAME DEVICE ADDRESS.
*
*
*       1:F4,0               1ST HARDWARE READ  PIPE SELCH
*       2:0,0                DUMMY CONTROLLER
*       3 RP01:80,197        READ   PIPE NO. 1
*       3 RP02:80,197        READ   PIPE NO. 2
*       3 RP03:80,197        READ   PIPE NO. 3
*       3 RP04:80,197        READ   PIPE NO. 4
*
*       1:F3,0               1ST HARDWARE WRITE PIPE SELCH
*       2:0,0                DUMMY CONTROLLER
```

```
*          3 WP01:81,198          WRITE PIPE NO. 1
*          3 WP02:81,198          WRITE PIPE NO. 2
*          3 WP03:81,198          WRITE PIPE NO. 3
*          3 WP04:81,198          WRITE PIPE NO. 4
*
*          1:F8,0                 2ND HARDWARE READ  PIPE SELCH
*          2:0,0                  DUMMY CONTROLLER
*          3 RP05:32,197          READ  PIPE NO. 5
*          3 RP06:32,197          READ  PIPE NO. 6
*          3 RP07:32,197          READ  PIPE NO. 7
*          3 RP08:32,197          READ  PIPE NO. 8
*
*          1:F7,0                 2ND HARDWARE WRITE PIPE SELCH
*          2:0,0                  DUMMY CONTROLLER
*          3 WP05:33,198          WRITE PIPE NO. 5
*          3 WP06:33,198          WRITE PIPE NO. 6
*          3 WP07:33,198          WRITE PIPE NO. 7
*          3 WP08:33,198          WRITE PIPE NO. 8
*
*
*     THE FOLLOWING SUMMARIZES ENTRY POINTS SPECIFIED BY THE DCB-S.
*
*          INITWPIP ESR FOR FUNCTION PIPE MANAGER REQUESTS
*          CMDWPIP  ESR FOR COMMAND  PIPE MANAGER REQUESTS
*          TERMWPIP ESR FOR GENERAL REQUEST TERMINATION
*
*
          LIST
          MLIBS 8,9,10
          $REGS$
          $TCB$
          $DCB$
          $CCB
          $EVN
*
          LIST
          TITLE DATA PIPE DEVICE DEPENDENT STRUCTURE AND CONTROL TABLE
*
PIPEDCB   STRUC                   DCB DEVICE DEPENDENT STRUCTURE
          DS    DCB.FCB
          ALIGN 4
DCB.PEST  DS    4                 PIPE END STATE (-1 TO +6)
*                                 -1=ERROR; SYNCHRONIZATION REQUIRED
*                                 0=SYNC; SYNC REQUEST RECEIVED
*                                 1=READY; IDLE OR UNMATED REQUEST
*                                 2=READY-HOLD; MATE CONNECTION
*                                 3=READY-ACTIVE; DMA STARTED
*                                 4=READY-INTERUPT; INTERUPT RECEIVED
*                                 5=READY-TERMINATE; GOOD CLEANUP
*                                 6=READY-ERROR; ERROR CLEANUP
DCB.CPIP  DS    4                 A(COMPLIMENTARY END DCB)
DCB.RTL   DS    4                 REQUESTED TRANSFER LENGTH
          ENDS
*
*
*         TIME OUT CONSTANTS IN USE (SECONDS)
TOCPIPE   EQU   60                SAFETY NET FOR PIPE SELCH DMA
TOCPAIR   EQU   600               SAFETY NET FOR PAIRING OF REQUESTS
*
*
*         COMMONLY USED CONSTANTS
ZERO      DC    X'0'              HALFWORD OF ZERO
ONE       DC    X'1'              HALFWORD OF ONE
MINUS1    DC    -1                HALFWORD OF -1
*
*         COMMONLY USED OUTPUT COMMAND BYTES.
```

```
DISARM    DB    X'C0'                  DISARM   PIPE INTERUPTS
DISABLE   DB    X'40'                  DISABLE  PIPE INTERUPTS
ENABLE    DB    X'80'                  ENABLE   PIPE INTERUPTS
SELCHSTP  DB    X'48'                  STOP SELCH
SELCHWR   DB    X'14'                  START SELCH WRITING
SELCHRD   DB    X'34'                  START SELCH READING
*
*
*
          ENTRY INITWPIP,CMDWPIP,TERMWPIP
          EXTRN DIRDONE,IODONE2,IODONE
          EXTRN ISPTAB,SQ,III,TOCHON,TOCHOFF
          EXTRN ADCHK,EVMOD,EVRTE,EVREL
          EXTRN SQS.SLV,SQS.MLV
*
          IMPUR
*****************************************
          TITLE INITWPIP ESR INITIALIZATION FOR FUNCTION MANAGER REQUESTS
          ALIGN 4
*****************************************
* * *     ESR INITWPIP, FUNCTION WRITE REQUESTS TO PIPE MANAGER
* * *     ENTRY SPECIFICATIONS:
* * *           UD = A(DCB)
* * *           UF = A(LEAF)
* * *     EXIT  SPECIFICATIONS:
* * *           EXIT TO IODONE2 OR DIRDONE
*****************************************
*
INITWPIP  EQU   *
* WRITE PIPE QUEUE NON-EMPTY ? YES, THEN
*   SIMPLY ADD THIS REQUEST TO WRITE QUEUE AND EXIT.
*   (NOTE THIS IS AUTOMATICALLY DONE BY THE IOH BEFORE DRIVER ENTRY)
          BAL   RA,LINKAGE             CHECK DCB LINKAGE
*   INITIALIZE SOME DCB ENTRIES
          LA    RE,PIPEWRIT            PREPARE TO START WRITE TRANSFER
          BAL   R8,EVMOD               DO IT WITH EVMOD FOR COMPATEBILITY
*                                      R9 DESTROYED !
          LIS   R8,0
          STH   R8,DCB.STAT(RD)        ZERO STATUS
*   DETERMINE TRANSFER LENGTH FOR COMPARISON AND USER RETURN.
          L     R8,DCB.SADR(RD)        CALCULATE REQUESTED TRANFER LENGTH
          THI   R8,1                   REQUIRE HALFWORD ALIGNMENT
          BNZ   INITERR3               COMPLAIN IF NOT
          NI    R8,Y'00FFFFFF'         PURIFY IT
          L     RA,DCB.EADR(RD)
*****     THI   RA,1                   REQUIRE EVEN NUMBER OF BYTES LENGTH
*****     BZ    INITERR3               COMPLAIN IF NOT
          NI    RA,Y'00FFFFFF'         PURIFY IT
          SR    RA,R8                  DIFFERENCE
          ST    RA,DCB.RTL(RD)         AND SAVE IT FOR FUTURE USE
          AIS   RA,1                   ADJUST FOR USER'S RETURN
          ST    RA,DCB.LLXF(RD)        INITIALIZE TRANSFER LENGTH
*   INITIALIZE SOME REGISTERS.
          L     R7,DCB.CPIP(RD)        A(COMPLIMENTARY DCB)
          L     RE,DCB.LEAF(R7)        A(COMPLIMENTARY LEAF)
*
* PROCESS WRITER PIPE REQUEST AT TOP OF QUEUE
* WRITER IN ERROR STATE ? YES, THEN
*   '8484' UNRECOVERABLE ERROR STATUS, AND TERMINATE.
          L     R8,DCB.PEST(RD)        WRITER END STATE
          BM    INITERR4               ERROR ? YES, UNRECOVERABLE
* PROCESS WRITER PIPE REQUEST AT TOP OF QUEUE.
* WRITER NOT IN ERROR STATE !
* READ PIPE QUEUE EMPTY OR CHANGING ? YES, THEN
*   SIMPLY KEEP THIS REQUEST AT TOP OF QUEUE AND EXIT.
          L     R8,EVN.DCB(RE)         READER LEAF OWNER
          BZ    HOLDQUE                ZERO ? YES, THEN NO PENDING REQUESTS
```

```
           LHL   R8,DCB.TOUT(R7)       'STABLE' TIMEOUT CONSTANT ?
           CHI   R8,X'7FFF'
           BNE   HOLDQUE
*                READ PIPE QUEUE NON-EMPTY AND STABLE !
*                THIS IMPLIES THAT THE READER IS IN EITHER SYNC
*                OR READY STATE AND A READER READ, FSR OR FSF
*                IS STUCK AT THE TOP OF THE READER QUEUE WHICH
*                CAN ONLY BE BROKEN LOSE BY THE WRITER (OR
*                A HALT I/O REQUEST FROM THE READER SIDE).
* PROCESS WRITER PIPE REQUEST AT TOP OF QUEUE.
* WRITER NOT IN ERROR STATE !
* READ PIPE QUEUE NON-EMPTY AND STABLE !
* WRITER IN SYNC STATE ? YES, THEN
*   READER IN READY STATE ? YES, THEN
*     READER TO ERROR STATE,
*     PURGE READER QUEUE WITH '8484' STATUS AND
*     KEEP THIS REQUEST AT TOP OF QUEUE AND EXIT.
*   READER IN SYNC STATE ? YES, THEN
*     WRITER SYNC, READER SYNC AND FIRST LEGITIMATE PAIR ARE MATED !
*     WRITER AND READER TO READY-HOLD STATE, AND GOTO ...
*   READER IN ERROR STATE IMPLIED !
*     MY LOGIC IS INCORRECT BECAUSE THIS SHOULD NEVER HAPPEN !
           L     R8,DCB.PEST(RD)       WRITER END STATE
           BNZ   AAAA                  NOT SYNC ? YES, THEN GOTO...
           L     R8,DCB.PEST(R7)       READER STATE
           BM    INITERR1              ERROR ? CRASH CRASH CRASH
           BP    AAAA1                 READY ? YES, THEN GOTO...
           LIS   R8,1                  1
           ST    R8,DCB.PEST(RD)       WRITER TO READY-IDLE
           ST    R8,DCB.PEST(R7)       READER TO READY-IDLE
           LB    R8,DCB.FC(R7)         EXAMINE READER FUNCTION CODE
           B     CCCC                  AND GO TO...
AAAA1      EQU   *                     READER READY STATE
           LCS   R8,1
           ST    R8,DCB.PEST(R7)       READER TO ERROR STATE
           LIS   R8,1
           STH   R8,DCB.TOUT(R7)       TIMEOUT TO PURGE READER
           B     HOLDQUE               AND KEEP WRITE REQUEST AT QUEUE TOP
*
AAAA       EQU   *
* PROCESS WRITER PIPE REQUEST AT TOP OF QUEUE.
* WRITER NOT IN ERROR STATE !
* READ PIPE QUEUE NON-EMPTY AND STABLE !
* WRITER NOT IN SYNC STATE !
* (WRITER IN READY STATE IMPLIED !)
* READER IN ERROR STATE ? YES, THEN
*   FLUSH WRITE DOWN THE DRAIN, GOOD WRITER'S WRITE STATUS, TERMINATE
           L     RC,DCB.PEST(R7)       READER END STATE
           BNP   IODONE2               NOT READY ? YES, WRITER'S DRAIN
* PROCESS WRITER PIPE REQUEST AT TOP OF QUEUE.
  WRITER NOT IN ERROR STATE !
  READ PIPE QUEUE NON-EMPTY AND STABLE !
  WRITER NOT IN SYNC STATE !
  (WRITER IN READY STATE IMPLIED !)
  READER NOT IN ERROR STATE !
  READER IN SYNC STATE ? YES, THEN
    FLUSH WRITE DOWN THE DRAIN, GOOD WRITER'S WRITE STATUS, TERMINATE
         *PERFORMED IN PREVIOUS SECTION*
  PROCESS WRITER PIPE REQUEST AT TOP OF QUEUE.
  WRITER NOT IN ERROR STATE !
  READ PIPE QUEUE NON-EMPTY AND STABLE !
  WRITER NOT IN SYNC STATE !
  (WRITER IN READY STATE IMPLIED !)
  READER NOT IN ERROR STATE !
  READER NOT IN SYNC STATE !
  (READER IN READY STATE IMPLIED !)
  WRITER WRITE, INTERPRET PAIRED READER FUNCTION CODE AND
```

```
* PROCESS MATED PAIRS ACCORDINGLY
         LB    R8,DCB.FC(R7)      EXAMINE READER FUNCTION CODE
         CHI   R8,X'C0'           REWIND ?
         BNE   BBBB               NO ? THEN GOTO...
         B     INITERR1
         LIS   R8,0
         ST    R8,DCB.PEST(R7)    READER TO SYNC STATE
         LIS   R8,1
         STH   R8,DCB.TOUT(R7)    TIMEOUT TO PURGE READER
         B     IODONE2            AND DRAIN THE WRITER'S WRITE
BBBB     EQU   *                  NOT REWIND !
         CHI   R8,X'D0'           UNLOAD ?
         BNE   CCCC               NO ? THEN GOTO...
         B     INITERR1
         LCS   R8,1               -1
         ST    R8,DCB.PEST(R7)    READER TO ERROR STATE
         LIS   R8,1
         STH   R8,DCB.TOUT(R7)    TIMEOUT TO PURGE READER
         B     IODONE2            AND DRAIN THE WRITER'S WRITE
CCCC     EQU   *                  NOT UNLOAD !
         CHI   R8,X'90'           FORWARD-SPACE-RECORD ?
         BNE   GGGG               NO ? THEN GOTO...
         LIS   R8,1
         STH   R8,DCB.TOUT(R7)    TIMEOUT TO PURGE READER
         B     IODONE2            AND EXIT
GGGG     EQU   *                  NOT FSR !
         CHI   R8,X'84'           FORWARD-SPACE-FILE ?
         BNE   DDDD               NO ? THEN GOTO...
*                KEEP READER'S FSF ON TOP OF READER'S QUEUE
         B     IODONE2            AND EXIT
DDDD     EQU   *                  NOT FORWARD-SPACE-FILE
**** AMAZING **** WE HAVE AN ACTUAL DATA TRANSFER REQUEST PAIRED !
         LA    R8,SQS.MLV         MULTI LEVEL SQS CONNECT
         ST    R8,EVN.SQS(RE)     INTO READER'S LEAF
         ST    R8,EVN.SQS(RF)     INTO WRITER'S LEAF
         LI    R8,IOBF.NHB        NON-HALTABLE BIT
         SBT   R8,DCB.RFLG(R7)    READER'S
         SBT   R8,DCB.RFLG(RD)    WRITER'S
         ATL   RF,SQ              SCHEDULE WRITER
         ATL   RE,SQ              SCHEDULE READER
         B     HOLDQUE            AND EXIT
*
*****************************************
         TITLE CMDWPIP  ESR INITIALIZATION FOR COMMAND MANAGER REQUESTS
         ALIGN 4
*****************************************
* * *    ESR CMDWPIP, COMMAND REQUESTS TO PIPE MANAGER
* * *    ENTRY SPECIFICATIONS:
* * *         UD = A(DCB)
* * *         UF = A(LEAF)
* * *    EXIT SPECIFICATIONS:
* * *         EXIT TO IODONE2 OR DIRDONE
*****************************************
*
CMDWPIP  EQU   *
* WRITE PIPE QUEUE NON-EMPTY ? YES, THEN
*    SIMPLY ADD THIS REQUEST TO WRITE QUEUE AND EXIT.
*    (NOTE THIS IS AUTOMATICALLY DONE BY THE IOH BEFORE DRIVER ENTRY)
         BAL   RA,LINKAGE         CHECK DCB LINKAGE
*    INITIALIZE SOME DCB ENTRIES
*          NOTE - FOLLOWING IS REQUIRED TO PURGE REQUESTS
         LA    RE,PIPEWRIT        PREPARE TO START WRITE TRANSFER
         BAL   R8,EVMOD           DO IT WITH EVMOD FOR COMPATEBILITY
*                                 R9 DESTROYED !
         LIS   R8,0
         STH   R8,DCB.STAT(RD)    ZERO STATUS
```

```
*       INITIALIZE SOME REGISTERS
                L       R7,DCB.CPIP(RD)         A(COMPLIMENTARY DCB)
                L       RE,DCB.LEAF(R7)         A(COMPLIMENTARY LEAF)
*
*       NOW DETERMINE THE PARTICULAR COMMAND (RW, WP, UNLOAD)
                LB      R8,DCB.FC(RD)           WRITER'S COMMAND FUNCTION CODE
                CHI     R8,X'C0'                REWIND ?
                BNE     MMMM                    NO ? THEN GOTO...
                LIS     R8,0
                ST      R8,DCB.PEST(RD)         WRITER STATE = SYNC
                B       NNNN                    AND PURGE READER
MMMM            EQU     *
                CHI     R8,X'D0'                UNLOAD ?
                BNE     OOOO                    NO ? THEN GOTO...
                LCS     R8,1
                ST      R8,DCB.PEST(RD)         WRITER STATE = ERROR
*                                               AND FALL THROUGH TO PURGE READER
NNNN            EQU     *
*
* READ PIPE QUEUE EMPTY OR CHANGING ? YES, THEN
*       SIMPLY TERMINATE.
                L       R8,EVN.DCB(RE)          READER LEAF OWNER
                BZ      IODONE2                 ZERO ? YES, THEN NO PENDING REQUESTS
                LHL     R8,DCB.TOUT(R7)         'STABLE' TIMEOUT CONSTANT ?
                CHI     R8,X'7FFF'
                BNE     IODONE2
*               READ PIPE QUEUE NON-EMPTY AND STABLE !
*               THIS IMPLIES THAT THE READER IS IN EITHER SYNC
*               OR READY STATE AND A READER READ, FSR OR FSF
*               IS STUCK AT THE TOP OF THE READER QUEUE WHICH
*               CAN ONLY BE BROKEN LOSE BY THE WRITER (OR
*               A HALT I/O REQUEST FROM THE READER SIDE).
*
* READ PIPE QUEUE NON-EMPTY AND STABLE !
* READER IN SYNC STATE ? YES, THEN
*    WRITER'S COMMAND (RW OR UNLOAD) SIMPLY TERMINATES.
* READER IN READY STATE ? YES, THEN
*    READER TO ERROR STATE,
*    PURGE READER REQUEST WITH '8484' STATUS AND
*    WRITER'S COMMAND (RW OR UNLOAD) TERMINATES
* READER IN ERROR STATE IMPLIED !
* MY LOGIC IS INCORRECT BECAUSE THIS SHOULD NEVER HAPPEN !
                L       R8,DCB.PEST(R7)         READER STATE
                BZ      IODONE2                 SYNC ? YES, SIMPLY TERMINATE
                BM      INITERR1                ERROR ? CRASH CRASH CRASH
                LHI     R8,X'8484'
                STH     R8,DCB.STAT(R7)         READER STATUS = '8484' UNRECOVERABLE
                LCS     R8,1
                ST      R8,DCB.PEST(R7)         READER TO ERROR STATE
                LIS     R8,1
                STH     R8,DCB.TOUT(R7)         TIMEOUT TO PURGE READER
                B       IODONE2                 AND TERMINATE WRITER'S COMMAND
*
*
OOOO            EQU     *                       NOT UNLOAD
*    THAT TAKES CARE OF THE SIMPLE IMMEDIATE COMMANDS
*    NOW THE WRITER'S COMMAND IS LIMITED TO WP.
*
* PROCESS WRITER PIPE REQUEST AT TOP OF QUEUE
* WRITER IN ERROR STATE ? YES, THEN
*    '8484' UNRECOVERABLE ERROR STATUS, AND TERMINATE.
                L       R8,DCB.PEST(RD)         WRITER END STATE
                BM      INITERR4                ERROR ? YES, UNRECOVERABLE
* PROCESS WRITER PIPE REQUEST AT TOP OF QUEUE.
* WRITER NOT IN ERROR STATE !
* READ PIPE QUEUE EMPTY OR CHANGING ? YES, THEN
```

```
*         SIMPLY KEEP THIS REQUEST AT TOP OF QUEUE AND EXIT.
          L       R8,EVN.DCB(RE)       READER LEAF OWNER
          BZ      HOLDQUE              ZERO ? YES, THEN NO PENDING REQUESTS
          LHL     R8,DCB.TOUT(R7)      'STABLE' TIMEOUT CONSTANT ?
          CHI     R8,X'7FFF'
          BNE     HOLDQUE
*                 READ PIPE QUEUE NON-EMPTY AND STABLE !
*                 THIS IMPLIES THAT THE READER IS IN EITHER SYNC
*                 OR READY STATE AND A READER READ, FSR OR FSF
*                 IS STUCK AT THE TOP OF THE READER QUEUE WHICH
*                 CAN ONLY BE BROKEN LOSE BY THE WRITER (OR
*                 A HALT I/O REQUEST FROM THE READER SIDE).
* PROCESS WRITER PIPE REQUEST AT TOP OF QUEUE.
* WRITER NOT IN ERROR STATE !
* READ PIPE QUEUE NON-EMPTY AND STABLE !
* WRITER IN SYNC STATE ? YES, THEN
*   READER IN READY STATE ? YES, THEN
*      READER TO ERROR STATE,
*      PURGE READER QUEUE WITH '8484' STATUS AND
*      KEEP THIS REQUEST AT TOP OF QUEUE AND EXIT.
*   READER IN SYNC STATE ? YES, THEN
*      WRITER SYNC, READER SYNC AND FIRST LEGITIMATE PAIR ARE MATED !
*      WRITER AND READER TO READY-HOLD STATE, AND GOTO ...
*   READER IN ERROR STATE IMPLIED !
*   MY LOGIC IS INCORRECT BECAUSE THIS SHOULD NEVER HAPPEN !
          L       R8,DCB.PEST(RD)      WRITER END STATE
          BNZ     PPPP                 NOT SYNC ? YES, THEN GOTO...
          L       R8,DCB.PEST(R7)      READER STATE
          BM      INITERR1             ERROR ? CRASH CRASH CRASH
          BP      PPPP1                READY ? YES, THEN GOTO...
          LIS     R8,1                 1
          ST      R8,DCB.PEST(RD)      WRITER TO READY-IDLE
          ST      R8,DCB.PEST(R7)      READER TO READY-IDLE
          LB      R8,DCB.FC(R7)        EXAMINE READER FUNCTION CODE
          B       RRRR                 AND GO TO...
PPPP1     EQU     *                    READER READY STATE
          LHI     R8,X'8484'
          STH     R8,DCB.STAT(R7)      READER STATUS = '8484' UNRECOVERABLE
          LCS     R8,1
          ST      R8,DCB.PEST(R7)      READER TO ERROR STATE
          LIS     R8,1
          STH     R8,DCB.TOUT(R7)      TIMEOUT TO PURGE READER
          B       HOLDQUE              AND KEEP WRITE REQUEST AT QUEUE TOP
*
PPPP      EQU     *
* PROCESS WRITER PIPE REQUEST AT TOP OF QUEUE.
* WRITER NOT IN ERROR STATE !
* READ PIPE QUEUE NON-EMPTY AND STABLE !
* WRITER NOT IN SYNC STATE !
* (WRITER IN READY STATE IMPLIED !)
* READER IN ERROR STATE ? YES, THEN
*   FLUSH WRITE DOWN THE DRAIN, GOOD WRITER'S WRITE STATUS, TERMINATE
          L       RC,DCB.PEST(R7)      READER END STATE
          BNP     IODONE2              NOT READY ? YES, WRITER'S DRAIN
* PROCESS WRITER PIPE REQUEST AT TOP OF QUEUE.
* WRITER NOT IN ERROR STATE !
* READ PIPE QUEUE NON-EMPTY AND STABLE !
* WRITER NOT IN SYNC STATE !
* (WRITER IN READY STATE IMPLIED !)
* READER NOT IN ERROR STATE !
* READER IN SYNC STATE ? YES, THEN
*   FLUSH WRITE DOWN THE DRAIN, GOOD WRITER'S WRITE STATUS, TERMINATE
*        *PERFORMED IN PREVIOUS SECTION*
* PROCESS WRITER PIPE REQUEST AT TOP OF QUEUE.
* WRITER NOT IN ERROR STATE !
* READ PIPE QUEUE NON-EMPTY AND STABLE !
```

```
* WRITER NOT IN SYNC STATE !
* (WRITER IN READY STATE IMPLIED !)
* READER NOT IN ERROR STATE !
* READER NOT IN SYNC STATE !
* (READER IN READY STATE IMPLIED !)
* WRITER COMMAND (WF),
* INTERPRET PAIRED READER FUNCTION CODE,
* PROCESS MATED PAIRS ACCORDINGLY
         LB    R8,DCB.FC(R7)      EXAMINE READER FUNCTION CODE
         CHI   R8,X'C0'           REWIND ?
         BNE   QQQQ               NO ? THEN GOTO...
         B     INITERR1
*        LIS   R8,0
*        ST    R8,DCB.PEST(R7)    READER TO SYNC STATE
*        LIS   R8,1
*        STH   R8,DCB.TOUT(R7)    TIMEOUT TO PURGE READER
*        B     IODONE2            AND DRAIN THE WRITER'S COMMAND
QQQQ     EQU   *                  NOT REWIND !
         CHI   R8,X'D0'           UNLOAD ?
         BNE   RRRR               NO ? THEN GOTO...
         B     INITERR1
*        LCS   R8,1               -1
*        ST    R8,DCB.PEST(R7)    READER TO ERROR STATE
*        LIS   R8,1
*        STH   R8,DCB.TOUT(R7)    TIMEOUT TO PURGE READER
*        B     IODONE2            AND DRAIN THE WRITER'S COMMAND
RRRR     EQU   *                  NOT UNLOAD !
         CHI   R8,X'90'           FORWARD-SPACE-RECORD ?
         BNE   VVVV               NO ? THEN GOTO...
         LHI   R8,X'8800'
         STH   R8,DCB.STAT(R7)    READER FSR STATUS = '8800' EOF
         LIS   R8,1
         STH   R8,DCB.TOUT(R7)    TIMEOUT TO PURGE READER
         B     IODONE2            AND EXIT
VVVV     EQU   *                  NOT FSR !
         CHI   R8,X'84'           FORWARD-SPACE-FILE ?
         BNE   SSSS               NO ? THEN GOTO...
         LHI   R8,X'8800'
         STH   R8,DCB.STAT(R7)    READER FSF STATUS = '8800' EOF
         LIS   R8,1
         STH   R8,DCB.TOUT(R7)    TIMEOUT TO PURGE READER
         B     IODONE2            AND EXIT
SSSS     EQU   *                  NOT FORWARD-SPACE-FILE
*                                 READER'S READ IMPLIED
         LHI   R8,X'8800'
         STH   R8,DCB.STAT(R7)    READER READ STATUS = '8800' EOF
         LIS   R8,1
         STH   R8,DCB.TOUT(R7)    TIMEOUT TO PURGE READER
         B     IODONE2            AND TERMINATE
*
*
************************************
*
*
* THE FOLLOWING CHECKS THE CROSS LINKAGE OF COMPLIMENTARY
* DCB PAIRS AND IF NECCESARY PERFORMS INITIALIZATION.
* INITIALIZATION IS NECCESARY ONLY ONCE UPON THE FIRST PIPE ACCESS
* AND IS EFFECTIVE FOR ALL PIPE ENDS THERE AFTER.
* INITIALIZATION INVOLVES FINDING ALL 197 AND 198 DCB (IN THE ORDER
* FOUND IN THE SYSTEM 'DMT' TABLE), PAIRING THEIR DCB.CPIP ENTRIES,
* INITIALIZING THEIR LEAF EVN.SQS TO SQS.SLV (SINGLE LEVEL
* CONNECTION) AND DISCONNECTING LEVEL 2 UP (WHICH IS INADVERTENTLY
* ACCOMPLISHED DURING THIS FIRST ACCESS).
* IF A PIPE END IS 'DANGLING' (A SYSGEN CUP CONFIGURATION ERROR
* WHICH LEAVES NO COMPLIMENTARY DCB AVAILABLE)
* DCB.CPIP IS SET TO MINUS ONE.
```

```
* ANY ACCESS TO SUCH A PIPE LEADS TO AN '8484' ERROR.
*
*
T197DCB   EQU   1                        A(CURRENT DCB TO TEST)
T198DCB   EQU   2                        A(CURRENT DCB TO TEST)
T197DMT   EQU   3                        A(CURRENT DMT ENTRY UNDER TEST)
T198DMT   EQU   4                        A(CURRENT DMT ENTRY UNDER TEST)
DCOD197   EQU   5                        DCB 197 DCOD VALUE
DCOD198   EQU   6                        DCB 198 DCOD VALUE
TEMP      EQU   7                        TEMPORARY REGISTER
* LINK    EQU   8                        INTERNAL LINK REGISTER
ASQSSLV   EQU   9                        A(SQS.SLV)
* LINK    EQU   10                       LINKAGE LINK REGISTER
          EXTRN DMT
*
LINKAGE   EQU   *
          L     TEMP,DCB.CPIP(RD)        HAVE WE BEEN INITIALIZED ?
          BPR   RA                       YES ? SIMPLY RETURN
          BM    INITERR6                 DANGLING PIPE END ?
*
*         PIPE DCB INITIALIZATION REQUIRED.
          LIS   RE,2
          BAL   R8,EVREL                 DISCONNECT AT LEVEL 2 UP
*
          LA    T197DMT,DMT              STARTING TEST 197 DMT ENTRY
          SIS   T197DMT,8
          LHI   DCOD197,197              DCB 197 DCOD VALUE
          LA    T198DMT,DMT              STARTING TEST 198 DMT ENTRY
          SIS   T198DMT,8
          LHI   DCOD199,198              DCB 198 DCOD VALUE
          LA    ASQSSLV,SQS.SLV          A(SQS.SLV)
*
FIND197   EQU   *
          AIS   T197DMT,8                INCREMENT TO NEXT DMT ENTRY
          L     T197DCB,4(T197DMT)       NEW DCB TO TEST
          BM    FIND197                  DUMMY DMT DCB ?
          BZ    FIND198                  END OF DMT ?
          CLB   DCOD197,DCB.DCOD(T197DCB) IS IT A 197 DCB ?
          BNE   FIND197                  NO ? TRY AGAIN
FIND198   EQU   *
          AIS   T198DMT,8                INCREMENT TO NEXT DMT ENTRY
          L     T198DCB,4(T198DMT)       NEW DCB TO TEST
          BM    FIND198                  DUMMY DMT DCB ?
          BZ    DANG197                  END OF DMT ?
          CLB   DCOD198,DCB.DCOD(T198DCB) IS IT A 198 DCB ?
          BNE   FIND198                  NO ? TRY AGAIN
*
DANG198   EQU   *                        CHECK FOR DANGLING 198 DCB'S
          LR    T197DCB,T197DCB
          BP    COMPLEM                  GOOD COMPLIMENTARY DCB PAIR
          LCS   TEMP,1
          ST    TEMP,DCB.CPIP(T198DCB)
          B     FIND198                  FIND ANY MORE DANGLING 198'S
*
DANG197   EQU   *                        CHECK FOR DNAGLING 197 DCB'S
          LR    T197DCB,T197DCB
          BNP   LINKAGE                  EXIT LINKAGE
          LCS   TEMP,1
          ST    TEMP,DCB.CPIP(T197DCB)
          SIS   T198DMT,8                FAKE THE LAST 198 DMT
          B     FIND197                  FIND ANY MORE DANGLING 198'S
*
COMPLEM   EQU   *
*         COMPLIMENTARY DCB   FOUND, FIX THINGS UP
          ST    T197DCB,DCB.CPIP(T198DCB)
          L     TEMP,DCB.LEAF(T197DCB)
```

```
             ST    ASQSSLV,EVN.SQS(TEMP)
             ST    T198DCB,DCB.CPIP(T197DCB)
             L     TEMP,DCB.LEAF(T198DCB)
             ST    ASQSSLV,EVN.SQS(TEMP)
             B     FIND197
*
*
************************************
*
*
HOLDQUE  EQU   *
*    THE CURRENT TOP OF QUEUE REQUEST IS HELD AS 'STABLE'
             BAL   R8,TOCHON          PUT ON TIMEOUT CHAIN
*                                     RA DESTROYED !
*    NOTE: TOCHON LEAVES '7FFF' IN DCB.TOUT ('STABLE')
             B     DIRDONE            AND EXIT INITIALIZATION
*
INITERR1 EQU   *
*    A CONDITION HAS ARISEN THAT WAS BELIEVED IMPOSSIBLE
             LCS   R8,1               -1
             ST    R8,DCB.PEST(RD)    WRITE END STATE = ERROR
             LIS   R8,0
             ST    R8,DCB.LLXF(RD)    ZERO TRANSFER LENGTH
             LHI   R8,X'9999'         STATUS = ILLEGAL FUNCTION
             STH   R8,DCB.STAT(RD)
             B     IODONE2            AND EXIT
*
INITERR2 EQU   *
*    SELCH GIVES FALSE SYNC ERROR
             LHI   R8,X'A000'         STATUS = DEVICE UNAVAILABLE
             OH    R8,DCB.SDN(RD)     OR THE SELCH ADDR INTO LOW BITS
             STH   R8,DCB.STAT(RD)
             B     TERMERR3           AND GOTO...
*
INITERR3 EQU   *
*    USER'S BUFFER ADDRESS NOT HALFWORD ALIGNED OR ODD BYTE COUNT ERROR
             LCS   R8,1               -1
             ST    R8,DCB.PEST(RD)    WRITE END STATE = ERROR
             LIS   R8,0
             ST    R8,DCB.LLXF(RD)    ZERO TRANSFER LENGTH
             LHI   R8,X'8483'         STATUS = UNRECOVERABLE ERROR
             STH   R8,DCB.STAT(RD)
             B     IODONE2            AND EXIT
*
INITERR4 EQU   *
*    UNRECOVERABLE ERROR IN LOGICAL SEQUENCE OF USER REQUESTS
             LCS   R8,1               -1
             ST    R8,DCB.PEST(RD)    WRITE END STATE = ERROR
             LIS   R8,0
             ST    R8,DCB.LLXF(RD)    ZERO TRANSFER LENGTH
             LHI   R8,X'8484'         STATUS = UNRECOVERABLE ERROR
             STH   R8,DCB.STAT(RD)
             B     IODONE2            AND EXIT
*
INITERR5 EQU   *
*    DEVICE GIVES FALSE SYNC ERROR
             LHI   R8,X'A000'         STATUS = DEVICE UNAVAILABLE
             OH    R8,DCB.DN(RD)      OR THE DEVICE ADDR INTO LOW BITS
             STH   R8,DCB.STAT(RD)
             B     TERMERR3           AND GOTO...
*
INITERR6 EQU   *
*    PIPE SYSTEM LINKAGE FAILURE, SYSGEN ERROR !
             LHI   R8,X'A100'         STATUS = DEVICE UNAVAILABLE (APPROX)
             STH   R8,DCB.STAT(RD)
             B     TERMERR3           AND GOTO...
```

```
*
*
***************************************
*
*
        TITLE PIPEWRIT  ESR INITIALIZATION TO START WRITE TRANSFER
        ALIGN 4
***************************************
* * *   ESR PIPEWRIT, ESR INITIALIZATION TO START WRITE TRANSFER
* * *   ENTRY SPECIFICATIONS:
* * *        UD = A(DCB)
* * *        UP = A(LEAF)
* * *   EXIT SPECIFICATIONS:
* * *        EXIT TO IODONE2 OR DIRDONE
***************************************
*
PIPEWRIT EQU   *
         LH    R8,DCB.TOUT(RD).      CHECK FOR TIME OUT
         BZ    TERMITE               PURGE BY READER IF WE HAVE
* INITIALIZE SOME REGISTERS
         L     R7,DCB.CPIP(RD)       A(COMPLIMENTARY DCB)
* FORCE ALL HARDWARE INTO IDLE CONDITION.
         LA    R8,III                FIND IGNORE INTERUPT IMMEDIATE
         LHL   RA,DCB.SDN(RD)        FIND THE SELCH ADDRESS
         STH   R8,ISPTAB(RA,RA)      ISP TABLE GETS IGNORE
         OC    RA,SELCHSTP           STOP THE SELCH
         BTC   4,INITERR2            ERROR IF SELCH GIVES FALSE SYNC
         LHL   RA,DCB.DN(RD)         FIND THE DEVICE ADDRESS
         STH   R8,ISPTAB(RA,PA)      ISP TABLE GETS IGNORE
         OC    RA,SELCHSTP           ADDRESS THE DEVICE
         BTC   4,INITERR5            ERROR IF DEVICE GIVES FALSE SYNC
         LHI   R8,TOCPAIR            SET UP TIME OUT CONSTANT
         STH   R8,DCB.TOUT(RD)
         LA    RE,TERMWPIP           PREPARE FOR TERMINATION
         BAL   R8,EVMOD              DO IT WITH EVMOD FOR COMPATEBILITY
                                     R9 DESTROYED !
         LIS   R8,2                  SET STATE = HOLD
         ST    R8,DCB.PEST(RD)
* IS THE OTHER END OF THE PIPE HOLD ?
         L     R8,DCB.PEST(R7)       COMPLIMENTARY STATE
         CHI   R8,2                  HOLD STATE IS 2
         BE    WRITCONT              = HOLD ? THEN GO TO ...
* WRITE REQUEST RECEIVED, NO COMPLIMENTARY REQUEST IN HOLD STATE
* REMAIN IN HOLD STATE AND EXIT DRIVER
         B     EVRTE                 AND EXIT DEVICE START UP
*
WRITCONT EQU   *
* WRITE REQUEST RECEIVED, COMPLIMENTARY REQUEST IN HOLD STATE
* SYNC ACHEIVED, TELL OTHER END OF PIPE GO TO ACTIVE,
* FOR DUAL READ/WRITE ACTIVATION SEQUENCE
         L     R6,DCB.LEAF(R7)       A(COMPLEMENTARY LEAF)
         ATL   R6,SQ                 ADD COMPLIMENTARY TO SYSTEM QUEUE
         B     EVRTE                 AND EXIT FOR NOW

***************************************
        IMPUR
        TITLE TERMINATION ESR FOR VARIOUS CONDITIONS
        ALIGN 4
***************************************
* *   ESR TERMWPIP, TERMINATION ROUTINE
* *   (DEFAULT TERMINATION ESR)
* *   ENTRY SPECIFICATIONS:
* *        UD = A(DCB)
* *        UP = A(LEAF)
* *   EXIT SPECIFICATIONS:
```

```
* *           EXIT TO IODONE OR TERMERR2
*******************************

?RMWPIP EQU     *
        LH      R6,DCB.TOUT(RD)         CHECK FOR TIME OUT
        BZ      TERMERR2                ERROR TERMINATION IF WE HAVE
    TERMINATE THIS I/O REQUEST AND EXIT.
        SR      R8,R8                   STATUS = NO ERROR
        STH     R8,DCB.STAT(RD)
        LIS     R8,1
        ST      R8,DCB.PEST(RD)         STATE = READY
?RMITE  EQU     *                       ENTRY FOR PURGE TERMINATION
        LA      R8,SQS.SLV              SINGLE LEVEL SQS CONNECT
        ST      R8,EVN.SQS(RF)          INTO WRITER'S LEAF
        BAL     R8,TOCHOFF              OFF THE TIME OUT CHAIN
                                        RA, RB DESTROYED !
        B       IODONE
*
*
******************************************
* * *   ESR TERMERR2, ERROR TERMINATION (TIME OUT OCCURED).
* * *   ENTRY SPECIFICATIONS:
* * *           UD = A(DCB)
* * *           UF = A(LEAF)
* * *   EXIT  SPECIFICATIONS:
* * *           EXIT TO IODONE
******************************************
*
TERMERR2 EQU    *
*   ESR TERMERR2, ERROR TERMINATION ROUTINE (TIME OUT OCCURED).
*   TERMINATE THIS I/O REQUEST AND EXIT.
*   FORCE ALL HARDWARE INTO IDLE CONDITION.
        LA      R8,III                  FIND IGNORE INTERUPT IMMEDIATE
        LHL     RA,DCB.SDN(RD)          FIND THE SELCH ADDRESS
        STH     R8,ISPTAB(RA,RA)        ISP TABLE GETS IGNORE
        OC      RA,SELCHSTP             STOP THE SELCH
        LHI     R8,X'8200'              STATUS = UNRECOVERABLE, TIME OUT
        OH      R8,DCB.SDN(RD)          OR THE SELCH ADDR INTO LOW BITS
        STH     R8,DCB.STAT(RD)
        LIS     R8,0
        ST      R8,DCB.LLXF(RD)         ZERO TRANFER LENGTH
        LCS     R8,1                    -1
        ST      R8,DCB.PEST(RD)         STATE = ERROR
        LA      R8,SQS.SLV              SINGLE LEVEL SQS CONNECT
        ST      R8,EVN.SQS(RF)          INTO WRITER'S LEAF
        BAL     R8,TOCHOFF              OFF THE TIME OUT CHAIN
                                        RA, RB DESTROYED !
*       B       IODONE
*
******************************************
* * *   ESR TERMERR3, ERROR TERMINATION (ISR DETECTED ERROR).
* * *   ENTRY SPECIFICATIONS:
* * *           UD = A(DCB)
* * *           UF = A(LEAF)
* * *   EXIT  SPECIFICATIONS:
* * *           EXIT TO IODONE
******************************************
*
TERMERR3 EQU    *
*   ESR TERMERR3, ERROR TERMINATION ROUTINE (ISR DETECTED ERROR).
*   TERMINATE THIS I/O REQUEST AND EXIT.
        LIS     R8,0
        ST      R8,DCB.LLXF(RD)         ZERO TRANFER LENGTH
        LCS     R8,1                    -1
        ST      R8,DCB.PEST(RD)         STATE = ERROR
        LA      R8,SQS.SLV              SINGLE LEVEL SQS CONNECT
```

```
        ST      R8,EVN.SQS(RF)          INTO WRITER'S LEAF
        BAL     R8,TOCHOPF              OFF THE TIME OUT CHAIN
*                                       RA, RB DESTROYED !
*       NOTE: OUR TERMINATION STATUS IS PROVIDED BY TERMERR3 SCHEDULER
*       B       IODONE
*
****************************************
*
****************************************
*
*
        END
```

We claim:

1. A data transfer method for use with a computer system comprising at least one processor, a memory system coupled to the at least one processor, and at least first and second selector channels, each coupled to the memory system, said method comprising the following steps:

providing a hardware interconnection between the first and second selector channels to allow digital information to be transferred directly from the first selector channel to the second selector channel;

running a first program on the computer system to generate a first set of digital data and to store said first set in a first portion of the memory system;

running a second program on the computer system, asynchronously with respect to said first program, said second program adapted to process the first set of digital data as stored in a second portion of the memory system; and utilizing the first and second selector channels and the hardware interconnection to transfer the first set of digital data in the first portion of the memory system directly to the second portion of the memory system, without intermediate mass storage.

2. The method of claim 1 wherein the first program generates a write request after the first set of data has been stored in the first portion, wherein the second program generates a read request, asynchronously with respect to generation of the write request, before processing data stored in the second portion, and wherein the utilizing step is performed after generation of both the write request and the read request.

3. The invention of claim 2 wherein execution of the first and second programs is suspended following generation of the write and read requests, respectively, until the completion of the utilizing step.

4. The invention of claim 1 wherein the at least one processor includes only a single processor, wherein the first and second selector channels are both coupled to transfer data with substantially the entire memory system, and wherein the first and second programs are run simultaneously on the single processor.

5. The invention of claim 1 wherein the transfer of the first set of digital data in the first portion of the memory system directly to the second portion of the memory system is accomplished without buffering.

6. A data transfer method for use with a computer system comprising at least one processor, a memory system coupled to the at least one processor, and at least first and second selector channels, each coupled to the memory system, said method comprising the following steps:

providing a hardware interconnection between the first and second selector channels to allow digital information to be transferred directly from the first selector channel to the second selector channel;

running a first program on the computer system to generate a first set of digital data and to store said first set in a first portion of the memory system, said first program operating to generate a data write request after said first set of data has been stored;

running a second program on the computer system, simultaneously with the first program, said second program adapted to process the first set of digital data as stored in a second portion of the memory system, said second program operating to generate a read data request prior to processing the first set of digital data asynchronously with respect to the write data request; and utilizing the first and second selector channels and the hardware interconnection, after both the data write request and the data read request have been generated, to transfer the first set of digital data in the first portion of the memory system by direct memory access directly to the second portion of the memory system without intermediate mass storage.

7. The method of claim 6 wherein the first set of digital data is transferred between the two selector channels in the utilizing step as sequential sets of parallel bits.

8. The method of claim 6 wherein the data write request comprises information indicative of the start of the first portion of the memory system and information indicative of the length of the first portion; and wherein the data read request comprises information indicative of the start of the second portion of the memory system and information indicative of the length of the second portion.

9. The method of claim 6 wherein the execution of the first and second programs is suspended during the period between the generation of the respective request and the completion of the transfer of the first set of digital data into the second portion of the memory system.

10. A data transfer method for a computer system comprising at least one processor coupled to a memory system and at least two selector channels, each coupled to transfer data with substantially the entire memory system, said method comprising the following steps;

providing a hardware interconnection between the first and second selector channels to allow digital information to be transferred directly from the first selector channel to the second selector channel;

running a first program on the computer system, said first program operative to generate a first set of digital information in a first set of locations of the memory system and then to generate a write data request;

running a second program on the computer system, simultaneously with the first program, said second program operative to generate a read data request, asynchronously with respect to the write data request, and then to process digital information stored in a second set of locations of the memory system;

suspending execution of the first program after the write data request has been generated and of the second program after the read data request has been generated;

utilizing the two selector channels and the hardware interconnection after the write and read data requests have been generated to transfer the first set of digital information directly from the first set of locations to the second set of locations at high speed by direct memory access, without intermediate mass storage; and then resuming execution of the first and second programs.

11. The method of claim 10 wherein the write data request comprises information indicative of the starting address and the length of the first set of locations; and wherein the read data request comprises information indicative of the starting address and the length of the second set of locations.

12. The method of claim 10 wherein the first set of digital data is transferred in parallel bytes between the two selector channels during the utilizing step.

13. In a computer system comprising a central processing unit, a memory system coupled to the central processing unit, and at least two direct memory access channels, each coupled to transfer data with substantially the entire memory system, the improvement comprising:

hardware means for interconnecting the two direct memory access channels to permit high speed transfer of digital information therebetween, such that a selected set of digital data can be read from a first portion of the memory system and written into a second portion of the memory system via the two channels and the interconnection means at high speed, without intermediate mass storage of the set of digital data.

14. The invention of claim 13 wherein the providing means operates to transfer digital information in parallel bytes between the two channels.

15. The invention of claim 13 wherein the providing means operates to transfer digital information between the two channels without buffering.

16. A data transfer method for use with a computer system comprising at least one processor, a memory system coupled to the at least one processor, and at least first and second selector channels, each coupled to the memory system, said method comprising the following steps:

providing a hardware interconnection between the first and second selector channels to allow digital information to be transferred directly from the first selector channel to the second selector channel such that data can be transferred directly from a first portion to a second portion of the memory system via the selector channels and the hardware interconnection, without intermediate mass storage;

providing means, included in the processor, for controlling the first and second selector channels and the hardware interconnection to maintain a plurality of write data pipe ends and a plurality of read data pipe ends, and to coordinate data transfers between respective write and read data pipe ends via the first and second selector channels and the hardware interconnection; and running a plurality of programs on the computer system to transfer data therebetween via a selected corresponding pair of the write and read data pipe ends by transferring data into the selected write data pipe end and receiving said transmitted data from the corresponding read data pipe end.

17. The method of claim 16 wherein each of the first and second selector channels is coupled to transfer data with substantially the entire memory system.

18. The method of claim 16 wherein the plurality of programs are run simultaneously but asynchronously on the computer system.

19. In a computer system comprising a central processing unit, a memory system coupled to the central processing unit, and at least two direct memory access channels coupled to the memory system, the improvement comprising:

a hardware connection coupled between first and second selector channels to allow digital information to be transferred from the first selector channel to the second selector channel such that data can be transferred directly from a first portion to a second portion of the memory system via the selector channels and the hardware interconnection, without intermediate mass storage;

means, included in the processor, for controlling the first and second selector channels and the hardware interconnection to maintain a plurality of write data pipe ends and a plurality of read data pipe ends, and to coordinate data transfers between respective write and read data pipe ends via the first and second selector channels and the hardware connection.

20. The invention of claim 19 wherein each of the first and second selector channels is coupled to transfer data with substantially the entire memory system.

* * * * *